(12) United States Patent
Adams et al.

(10) Patent No.: US 12,456,342 B2
(45) Date of Patent: Oct. 28, 2025

(54) KIOSK-BASED SYSTEMS AND METHODS FOR DIRECT DEPOSIT OF COIN AND/OR OTHER CASH VALUE

(71) Applicants: Coinstar Asset Holdings, LLC, Bellevue, WA (US); TabaPay, Inc., Mountain View, CA (US)

(72) Inventors: Stephen M. Adams, Maple Valley, WA (US); Rodney A. Robinson, Los Altos Hills, CA (US)

(73) Assignees: Coinstar Assett Holdings, LLC, Bellevue, WA (US); TabaPay, Inc., Mountain View, CA (US)

( * ) Notice: Subject to any disclaimer, the term of this patent is extended or adjusted under 35 U.S.C. 154(b) by 25 days.

(21) Appl. No.: 17/998,229

(22) PCT Filed: May 7, 2021

(86) PCT No.: PCT/US2021/031414
§ 371 (c)(1),
(2) Date: Nov. 8, 2022

(87) PCT Pub. No.: WO2021/226540
PCT Pub. Date: Nov. 11, 2021

(65) Prior Publication Data
US 2023/0274622 A1    Aug. 31, 2023

Related U.S. Application Data

(60) Provisional application No. 63/022,381, filed on May 8, 2020.

(51) Int. Cl.
*G06Q 40/00*    (2023.01)
*G06Q 20/18*    (2012.01)
(Continued)

(52) U.S. Cl.
CPC ............. *G07D 13/00* (2013.01); *G06Q 20/18* (2013.01); *G07F 19/202* (2013.01)

(58) Field of Classification Search
CPC ...................................................... G06Q 20/18
See application file for complete search history.

(56) References Cited

U.S. PATENT DOCUMENTS 269,461  A    12/1882  Rakestraw
446,303  A    2/1891   Thompson
(Continued)

FOREIGN PATENT DOCUMENTS

CA    1053598    5/1979
CA    2060630    8/1992
(Continued)

OTHER PUBLICATIONS

Cook, John (Turning coins into digital currency, Coinstar expands PayPal trial, HTTPS://WWW.GEEKWIRE.COM/AUTHOR/JOHN/ Feb. 27, 2013) (Year: 2013).*
(Continued)

*Primary Examiner* — Mark H Gaw
(74) *Attorney, Agent, or Firm* — Perkins Coie LLP

(57) ABSTRACT

Various embodiments of systems and methods for direct depositing funds (e.g., consumer coin value, paper cash value, etc.) into an account at a bank or other financial institution are disclosed herein. In some embodiments, the systems and methods described herein enable a consumer to pour a batch of loose coins into a coin counting kiosk and have the coin value deposited directly into one of the consumer's accounts at a financial institution (e.g., a debit card account, credit card account, savings account, checking account, etc.) by swiping their bank card through (or inserting their bank card into) a card reader at the kiosk and selecting the desired transaction.

22 Claims, 14 Drawing Sheets

(51) Int. Cl.
*G07D 13/00* (2006.01)
*G07F 19/00* (2006.01)

(56) References Cited

U.S. PATENT DOCUMENTS

| | | |
|---|---|---|
| 545,185 A | 8/1895 | Yost |
| 576,141 A | 2/1897 | Muenchinger |
| 1,010,993 A | 12/1911 | White |
| 1,234,707 A | 7/1917 | Whistler |
| 1,345,858 A | 7/1920 | Jenkins |
| 1,711,049 A | 4/1929 | Fonda et al. |
| 1,813,296 A | 7/1931 | Kidwell |
| 1,847,940 A | 3/1932 | Giles |
| 1,945,948 A | 2/1934 | Morin |
| 2,014,505 A | 9/1935 | Patche |
| 2,317,351 A | 4/1943 | Andalikiewicz et al. |
| 2,461,314 A | 2/1949 | Davis et al. |
| 2,569,360 A | 9/1951 | Weingart |
| 2,644,470 A | 7/1953 | Labbe |
| 2,865,561 A | 12/1958 | Rosapepe |
| 2,881,774 A | 4/1959 | Labbe |
| 2,960,377 A | 11/1960 | Simjian |
| 3,009,555 A | 11/1961 | Seckula, Sr. |
| 3,048,251 A | 8/1962 | Bower |
| 3,056,132 A | 9/1962 | Simjian |
| 3,065,467 A | 11/1962 | Prevost |
| 3,132,654 A | 5/1964 | Adams |
| 3,173,742 A | 3/1965 | Simjian |
| 3,196,257 A | 7/1965 | Buchholtz et al. |
| 3,227,363 A | 1/1966 | Hecker et al. |
| 3,286,805 A | 11/1966 | New |
| 3,396,737 A | 8/1968 | Picollo |
| 3,415,348 A | 12/1968 | Wahlberg |
| 3,599,771 A | 8/1971 | Hinterstocker |
| 3,603,327 A | 9/1971 | Buchholz et al. |
| 3,709,145 A | 1/1973 | Williamson |
| 3,763,871 A | 10/1973 | Jobst |
| 3,788,440 A | 1/1974 | Propice et al. |
| 3,791,574 A | 2/1974 | Picquot |
| 3,815,717 A | 6/1974 | Arseneau |
| 3,941,226 A | 3/1976 | Drakes |
| 3,960,293 A | 6/1976 | Sweet, II et al. |
| 3,969,584 A | 7/1976 | Miller et al. |
| 3,982,620 A | 9/1976 | Kortenhaus |
| 3,984,660 A | 10/1976 | Oka et al. |
| 3,998,237 A | 12/1976 | Kressin et al. |
| 4,014,424 A | 3/1977 | Hall |
| 4,036,242 A | 7/1977 | Breitenstein et al. |
| 4,058,954 A | 11/1977 | Asami |
| 4,059,122 A | 11/1977 | Kinoshita |
| 4,092,990 A | 6/1978 | Bayne |
| 4,099,722 A | 7/1978 | Rodesch et al. |
| 4,100,925 A | 7/1978 | Fukunaga |
| 4,106,610 A | 8/1978 | Heiman |
| 4,124,109 A | 11/1978 | Bissell et al. |
| 4,141,372 A | 2/1979 | Gdanski |
| 4,167,949 A | 9/1979 | Hashimoto et al. |
| 4,172,462 A | 10/1979 | Uchida et al. |
| 4,225,056 A | 9/1980 | Flubacker |
| 4,228,811 A | 10/1980 | Tanaka et al. |
| 4,230,213 A | 10/1980 | Spring |
| 4,249,552 A | 2/1981 | Margolin |
| 4,264,282 A | 4/1981 | Crago |
| 4,266,121 A | 5/1981 | Hirose |
| 4,275,751 A | 6/1981 | Bergman |
| 4,306,644 A | 12/1981 | Rockola et al. |
| 4,321,672 A | 3/1982 | Braun et al. |
| 4,326,620 A | 4/1982 | Felix et al. |
| 4,346,798 A | 8/1982 | Agey, III |
| 4,356,829 A | 11/1982 | Furuya |
| 4,360,034 A | 11/1982 | Davila et al. |
| 4,369,442 A | 1/1983 | Werth et al. |
| 4,369,800 A | 1/1983 | Watanabe et al. |
| 4,374,557 A | 2/1983 | Sugimoto et al. |
| 4,376,442 A | 3/1983 | Gomez et al. |
| 4,380,316 A | 4/1983 | Glinka et al. |
| 4,383,540 A | 5/1983 | De Meyer et al. |
| 4,398,550 A | 8/1983 | Shireman |
| 4,412,292 A | 10/1983 | Sedam et al. |
| 4,412,607 A | 11/1983 | Collins et al. |
| 4,434,359 A | 2/1984 | Watanabe |
| 4,436,103 A | 3/1984 | Dick |
| 4,442,850 A | 4/1984 | Austin et al. |
| 4,447,714 A | 5/1984 | Lundblad et al. |
| 4,503,963 A | 3/1985 | Steiner |
| 4,504,357 A | 3/1985 | Holbein et al. |
| 4,506,685 A | 3/1985 | Childers et al. |
| 4,509,122 A | 4/1985 | Agnew et al. |
| 4,509,633 A | 4/1985 | Chow |
| 4,542,817 A | 9/1985 | Paulson |
| 4,543,969 A | 10/1985 | Rasmussen |
| 4,554,446 A | 11/1985 | Murphy et al. |
| 4,555,618 A | 11/1985 | Riskin |
| 4,558,711 A | 12/1985 | Ikuta Yoshiaki et al. |
| 4,577,744 A | 3/1986 | Doucet et al. |
| 4,587,984 A | 5/1986 | Levasseur et al. |
| 4,597,487 A | 7/1986 | Crosby et al. |
| 4,598,378 A | 7/1986 | Giacomo |
| 4,611,205 A | 9/1986 | Eglise et al. |
| 4,616,323 A | 10/1986 | Hayashi |
| 4,616,776 A | 10/1986 | Blumenthal et al. |
| 4,620,559 A | 11/1986 | Childers |
| 4,622,456 A | 11/1986 | Naruto et al. |
| 4,641,239 A | 2/1987 | Takesako |
| 4,672,377 A | 6/1987 | Murphy et al. |
| 4,674,055 A | 6/1987 | Ogaki et al. |
| 4,677,565 A | 6/1987 | Ogaki et al. |
| 4,694,845 A | 9/1987 | Zay |
| 4,706,577 A | 11/1987 | Jones |
| 4,706,795 A | 11/1987 | Mikami et al. |
| 4,716,799 A | 1/1988 | Hartmann |
| 4,723,212 A | 2/1988 | Mindrum et al. |
| 4,733,765 A | 3/1988 | Watanabe |
| 4,753,625 A | 6/1988 | Okada |
| 4,767,917 A | 8/1988 | Ushikuba |
| 4,775,353 A | 10/1988 | Childers et al. |
| 4,775,354 A | 10/1988 | Rasmussen et al. |
| 4,809,837 A | 3/1989 | Hayashi et al. |
| 4,814,589 A | 3/1989 | Storch et al. |
| 4,817,043 A | 3/1989 | Brown |
| 4,831,374 A | 5/1989 | Masel |
| 4,833,308 A | 5/1989 | Humble |
| 4,882,675 A | 11/1989 | Nichtberger et al. |
| 4,883,158 A | 11/1989 | Kobayashi et al. |
| 4,884,672 A | 12/1989 | Parker |
| 4,896,791 A | 1/1990 | Smith |
| 4,898,564 A | 2/1990 | Gunn et al. |
| 4,910,672 A | 3/1990 | Off et al. |
| 4,915,205 A | 4/1990 | Reid et al. |
| 4,921,463 A | 5/1990 | Primdahl et al. |
| 4,936,436 A | 6/1990 | Keltner |
| 4,953,086 A | 8/1990 | Fukatsu |
| 4,959,624 A | 9/1990 | Higgins, Jr. et al. |
| 4,963,118 A | 10/1990 | Gunn et al. |
| 4,964,495 A | 10/1990 | Rasmussen |
| 4,969,549 A | 11/1990 | Eglise |
| 4,977,502 A | 12/1990 | Baker et al. |
| 4,978,322 A | 12/1990 | Paulsen |
| 4,995,848 A | 2/1991 | Goh |
| 4,997,406 A | 3/1991 | Horiguchi et al. |
| 5,010,238 A * | 4/1991 | Kadono ............ G07F 19/211 902/8 |
| 5,021,967 A | 6/1991 | Smith |
| 5,022,889 A | 6/1991 | Ristvedt et al. |
| 5,025,139 A | 6/1991 | Halliburton, Jr. |
| 5,027,937 A | 7/1991 | Parish et al. |
| 5,039,848 A | 8/1991 | Stoken |
| 5,040,657 A | 8/1991 | Gunn et al. |
| 5,055,657 A | 10/1991 | Miller et al. |
| 5,056,644 A | 10/1991 | Parker |
| 5,073,767 A | 12/1991 | Holmes et al. |
| 5,083,765 A | 1/1992 | Kringel |
| 5,083,814 A | 1/1992 | Guinta et al. |
| 5,088,587 A | 2/1992 | Goodrich et al. |

(56) References Cited

U.S. PATENT DOCUMENTS

| | | |
|---|---|---|
| 5,091,713 A | 2/1992 | Horne et al. |
| 5,098,339 A | 3/1992 | Dabrowski |
| 5,098,340 A | 3/1992 | Abe |
| 5,100,367 A | 3/1992 | Abe |
| 5,111,927 A | 5/1992 | Schulze, Jr. |
| 5,114,381 A | 5/1992 | Ueda et al. |
| 5,135,433 A | 8/1992 | Watanabe et al. |
| 5,163,868 A | 11/1992 | Adams et al. |
| 5,173,851 A | 12/1992 | Off et al. |
| 5,174,608 A | 12/1992 | Benardelli |
| 5,183,142 A | 2/1993 | Latchinian et al. |
| 5,195,626 A | 3/1993 | Le Hong et al. |
| 5,197,588 A | 3/1993 | Furuya et al. |
| 5,201,396 A | 4/1993 | Chalabian et al. |
| 5,219,059 A | 6/1993 | Furuya et al. |
| 5,226,519 A | 7/1993 | DeWoolfson |
| 5,227,874 A | 7/1993 | Von Kohorn |
| 5,227,966 A | 7/1993 | Ichiba |
| 5,236,339 A | 8/1993 | Nishiumi et al. |
| 5,247,159 A * | 9/1993 | Yuge ............... G07D 11/36 902/12 |
| 5,251,738 A | 10/1993 | Dabrowski |
| 5,252,811 A | 10/1993 | Henochowicz et al. |
| 5,265,033 A | 11/1993 | Vajk et al. |
| 5,293,981 A | 3/1994 | Abe et al. |
| 5,299,672 A | 4/1994 | Nishiumi et al. |
| 5,299,673 A | 4/1994 | Wu |
| 5,302,811 A | 4/1994 | Fukatsu |
| 5,305,195 A | 4/1994 | Murphy |
| 5,316,120 A | 5/1994 | Ibarrola |
| 5,316,517 A | 5/1994 | Chiba et al. |
| 5,317,135 A | 5/1994 | Finocchio |
| 5,321,242 A | 6/1994 | Heath, Jr. |
| 5,328,014 A | 7/1994 | Nishiumi et al. |
| 5,330,041 A | 7/1994 | Dobbins et al. |
| 5,350,906 A | 9/1994 | Brody et al. |
| 5,355,988 A | 10/1994 | Shirasawa |
| 5,365,046 A | 11/1994 | Haymann |
| 5,374,814 A | 12/1994 | Kako et al. |
| 5,388,680 A | 2/1995 | Hird et al. |
| RE34,915 E | 4/1995 | Nichtberger et al. |
| 5,409,092 A | 4/1995 | Itako et al. |
| 5,429,222 A | 7/1995 | Delay |
| 5,435,777 A | 7/1995 | Takatani et al. |
| 5,440,108 A | 8/1995 | Tran et al. |
| 5,441,139 A | 8/1995 | Abe et al. |
| 5,449,058 A | 9/1995 | Kotler et al. |
| 5,457,305 A | 10/1995 | Akel et al. |
| 5,469,951 A | 11/1995 | Takemoto et al. |
| 5,479,507 A | 12/1995 | Anderson |
| 5,483,363 A | 1/1996 | Holmes et al. |
| 5,506,393 A | 4/1996 | Ziarno |
| 5,511,114 A | 4/1996 | Stimson et al. |
| 5,513,738 A | 5/1996 | Hird et al. |
| 5,531,640 A | 7/1996 | Inoue |
| 5,554,070 A | 9/1996 | Takatoshi et al. |
| 5,555,497 A | 9/1996 | Heibling |
| 5,560,467 A | 10/1996 | Takemoto et al. |
| 5,564,546 A | 10/1996 | Molbak et al. |
| 5,564,974 A | 10/1996 | Mazur et al. |
| 5,577,109 A | 11/1996 | Stimson et al. |
| 5,577,959 A | 11/1996 | Takemoto et al. |
| 5,620,079 A | 4/1997 | Molbak |
| 5,637,845 A | 6/1997 | Kolls |
| 5,650,604 A | 7/1997 | Marcous et al. |
| 5,652,421 A | 7/1997 | Veeneman et al. |
| 5,661,285 A | 8/1997 | Elrick et al. |
| 5,663,546 A | 9/1997 | Cucinotta et al. |
| 5,665,952 A | 9/1997 | Ziarno |
| D385,488 S | 10/1997 | Smith et al. |
| 5,679,070 A | 10/1997 | Ishida et al. |
| 5,696,908 A | 12/1997 | Muehlberger et al. |
| 5,699,328 A | 12/1997 | Ishizaki et al. |
| 5,721,768 A | 2/1998 | Stimson et al. |
| 5,732,398 A | 3/1998 | Tagawa |
| 5,734,722 A | 3/1998 | Halpern |
| 5,743,429 A | 4/1998 | Morofsky |
| 5,746,299 A | 5/1998 | Molbak et al. |
| 5,746,322 A | 5/1998 | LaVeine et al. |
| 5,748,908 A | 5/1998 | Yu |
| 5,777,305 A | 7/1998 | Smith et al. |
| 5,799,767 A | 9/1998 | Molbak |
| 5,835,061 A | 11/1998 | Stewart |
| 5,839,956 A | 11/1998 | Takemoto |
| 5,842,916 A | 12/1998 | Gerrity et al. |
| 5,868,236 A | 2/1999 | Rademacher |
| 5,880,444 A | 3/1999 | Shibata |
| 5,903,880 A | 5/1999 | Biffar |
| 5,905,810 A | 5/1999 | Jones et al. |
| 5,909,792 A | 6/1999 | Gerlier et al. |
| 5,909,793 A | 6/1999 | Beach et al. |
| 5,909,794 A | 6/1999 | Molbak et al. |
| 5,943,423 A | 8/1999 | Muftic et al. |
| 5,943,655 A | 8/1999 | Jacobson |
| 5,953,504 A | 9/1999 | Sokal et al. |
| 5,956,697 A | 9/1999 | Usui |
| 5,964,830 A | 10/1999 | Durrett |
| 5,974,146 A | 10/1999 | Randle et al. |
| 5,982,918 A | 11/1999 | Mennie et al. |
| 5,988,348 A | 11/1999 | Martin et al. |
| 5,991,413 A | 11/1999 | Arditti et al. |
| 6,014,636 A | 1/2000 | Reeder |
| 6,014,646 A | 1/2000 | Vallee et al. |
| 6,017,063 A | 1/2000 | Nilssen |
| 6,021,883 A | 2/2000 | Casanova et al. |
| 6,028,920 A | 2/2000 | Carson |
| 6,047,807 A | 4/2000 | Molbak |
| 6,047,808 A | 4/2000 | Neubarth et al. |
| 6,053,807 A | 4/2000 | Metzger et al. |
| 6,068,550 A | 5/2000 | Breitholtz et al. |
| 6,081,791 A | 6/2000 | Clark |
| 6,105,007 A | 8/2000 | Norris |
| 6,105,008 A | 8/2000 | Davis et al. |
| 6,105,009 A | 8/2000 | Cuervo |
| 6,110,044 A | 8/2000 | Stern |
| 6,116,402 A | 9/2000 | Beach et al. |
| 6,119,099 A | 9/2000 | Walker et al. |
| 6,119,945 A | 9/2000 | Muller et al. |
| 6,128,402 A | 10/2000 | Jones et al. |
| 6,129,275 A | 10/2000 | Urquhart et al. |
| 6,138,106 A | 10/2000 | Walker et al. |
| 6,144,946 A | 11/2000 | Iwamura |
| 6,152,365 A | 11/2000 | Kolls |
| 6,185,545 B1 | 2/2001 | Resnick et al. |
| 6,193,155 B1 | 2/2001 | Walker et al. |
| 6,196,371 B1 | 3/2001 | Martin et al. |
| 6,227,343 B1 | 5/2001 | Neathway et al. |
| 6,230,928 B1 | 5/2001 | Hanna et al. |
| 6,233,564 B1 | 5/2001 | Schulze, Jr. |
| 6,243,450 B1 | 6/2001 | Jansen et al. |
| 6,243,687 B1 | 6/2001 | Powell |
| 6,264,545 B1 | 7/2001 | Magee et al. |
| 6,267,292 B1 | 7/2001 | Walker et al. |
| 6,269,349 B1 | 7/2001 | Aieta et al. |
| 6,289,324 B1 | 9/2001 | Kawan |
| 6,292,211 B1 | 9/2001 | Pena |
| 6,308,887 B1 | 10/2001 | Korman et al. |
| 6,318,536 B1 | 11/2001 | Korman |
| 6,318,537 B1 | 11/2001 | Jones et al. |
| 6,330,544 B1 | 12/2001 | Walker et al. |
| 6,349,972 B1 | 2/2002 | Geiger et al. |
| 6,363,164 B1 | 3/2002 | Jones et al. |
| 6,370,240 B1 | 4/2002 | Woynoski et al. |
| 6,370,514 B1 | 4/2002 | Messner |
| 6,375,080 B1 | 4/2002 | Cremonese |
| 6,390,269 B1 | 5/2002 | Billington et al. |
| 6,401,010 B1 | 6/2002 | Takahashi |
| 6,405,182 B1 | 6/2002 | Cuervo |
| 6,415,262 B1 | 7/2002 | Walker et al. |
| 6,456,981 B1 | 9/2002 | Dejaeger |
| 6,460,357 B1 | 10/2002 | Doi et al. |
| 6,484,863 B1 | 11/2002 | Molbak |
| 6,488,203 B1 | 12/2002 | Stoutenburg et al. |
| 6,494,776 B1 | 12/2002 | Molbak |

(56) References Cited

U.S. PATENT DOCUMENTS

| | | | |
|---|---|---|---|
| 6,499,052 B1 | 12/2002 | Hoang et al. |
| 6,502,745 B1 | 1/2003 | Stimson et al. |
| 6,505,774 B1 | 1/2003 | Fulcher et al. |
| 6,536,037 B1 | 3/2003 | Guheen et al. |
| 6,554,184 B1 | 4/2003 | Amos |
| 6,575,361 B1 | 6/2003 | Graves et al. |
| 6,575,362 B1 | 6/2003 | Bator et al. |
| 6,594,644 B1 | 7/2003 | Van Dusen |
| 6,607,136 B1 | 8/2003 | Atsmon et al. |
| 6,628,934 B2 | 9/2003 | Rosenberg et al. |
| 6,637,576 B1 | 10/2003 | Jones et al. |
| 6,659,259 B2 | 12/2003 | Knox et al. |
| 6,661,910 B2 | 12/2003 | Jones et al. |
| 6,694,300 B1 | 2/2004 | Walker et al. |
| 6,704,039 B2 | 3/2004 | Pena |
| 6,705,448 B1 | 3/2004 | Steel |
| 6,736,251 B2 | 5/2004 | Molbak |
| 6,745,022 B2 | 6/2004 | Knox |
| 6,748,067 B2 | 6/2004 | Malik |
| 6,748,101 B1 | 6/2004 | Jones et al. |
| 6,758,316 B2 | 7/2004 | Molbak |
| 6,772,146 B2 | 8/2004 | Khemlani et al. |
| 6,778,693 B2 | 8/2004 | Jones et al. |
| 6,799,084 B2 | 9/2004 | Grobler |
| 6,823,172 B1 | 11/2004 | Forrest |
| 6,829,596 B1 | 12/2004 | Frazee |
| 6,854,581 B2 | 2/2005 | Molbak |
| 6,857,562 B2 | 2/2005 | Sasaki |
| 6,918,537 B2 | 7/2005 | Graves et al. |
| 6,934,529 B2 | 8/2005 | Bagoren |
| 6,945,457 B1 | 9/2005 | Barcelou |
| 6,960,986 B2 | 11/2005 | Asama et al. |
| 6,973,172 B1 | 12/2005 | Bitove et al. |
| 6,973,443 B2 | 12/2005 | Drummond et al. |
| 6,976,570 B2 | 12/2005 | Molbak |
| 6,999,569 B2 | 2/2006 | Risafi et al. |
| 7,006,993 B1 | 2/2006 | Cheong et al. |
| 7,028,827 B1 | 4/2006 | Molbak et al. |
| 7,028,891 B2 | 4/2006 | O'Neal |
| 7,039,603 B2 | 5/2006 | Walker et al. |
| 7,054,842 B2 | 5/2006 | James et al. |
| 7,058,581 B1 | 6/2006 | Young |
| 7,083,084 B2 | 8/2006 | Graves et al. |
| 7,093,761 B2 | 8/2006 | Smith et al. |
| 7,113,929 B1 | 9/2006 | Beach et al. |
| 7,131,580 B2 | 11/2006 | Molbak et al. |
| 7,156,300 B1 | 1/2007 | Dentlinger |
| 7,168,615 B2 | 1/2007 | Smith |
| 7,184,980 B2 | 2/2007 | Allen-Rouman et al. |
| 7,209,889 B1 | 4/2007 | Whitfield |
| 7,249,054 B2 | 7/2007 | Keil |
| 7,251,626 B2 | 7/2007 | Blackson et al. |
| 7,252,226 B2 | 8/2007 | Risaki et al. |
| 7,255,268 B2 | 8/2007 | Dentlinger |
| 7,266,533 B2 | 9/2007 | Karas et al. |
| 7,287,005 B1 | 10/2007 | Bruecken |
| 7,303,119 B2 | 12/2007 | Molbak |
| 7,311,249 B2 | 12/2007 | Smith et al. |
| 7,313,546 B2 | 12/2007 | Alarcom-Luther et al. |
| 7,328,190 B2 | 2/2008 | Smith et al. |
| 7,333,955 B2 | 2/2008 | Graves et al. |
| RE40,186 E | 3/2008 | Walker et al. |
| 7,343,349 B2 | 3/2008 | Ranzini et al. |
| 7,349,566 B2 | 3/2008 | Jones et al. |
| 7,356,507 B2 | 4/2008 | Bezos et al. |
| 7,398,225 B2 | 7/2008 | Voltmer et al. |
| 7,426,493 B2 | 9/2008 | Takeshima et al. |
| 7,473,177 B2 | 1/2009 | Walker et al. |
| 7,505,941 B2 | 3/2009 | Bishop et al. |
| 7,522,716 B2 | 4/2009 | Paschini |
| 7,527,193 B2 | 5/2009 | Molbak |
| 7,529,563 B1 | 5/2009 | Pitroda |
| 7,630,926 B2 | 12/2009 | Chakiris et al. |
| 7,634,425 B2 | 12/2009 | Satomi et al. |
| 7,647,259 B2 | 1/2010 | De Fabrega |
| 7,653,599 B2 | 1/2010 | Doran et al. |
| 7,660,767 B1 | 2/2010 | Schultz et al. |
| 7,676,431 B2 | 3/2010 | O'Leary et al. |
| 7,778,456 B2 | 8/2010 | Jones et al. |
| 7,780,075 B2 | 8/2010 | Cooper et al. |
| 7,865,432 B2 | 1/2011 | Doran et al. |
| 7,865,447 B2 | 1/2011 | Rosenhaft et al. |
| 7,874,478 B2 | 1/2011 | Molbak |
| 7,891,554 B2 * | 2/2011 | Graef ................ G07D 7/12 705/40 |
| 7,904,565 B2 | 3/2011 | Holden et al. |
| 7,971,699 B2 | 7/2011 | Molbak |
| 8,005,425 B2 | 8/2011 | Defosse et al. |
| 8,024,272 B2 | 9/2011 | Doran et al. |
| 8,033,375 B2 | 10/2011 | Doran et al. |
| 8,082,195 B2 | 12/2011 | Enzaldo |
| 8,083,133 B2 | 12/2011 | Seifert et al. |
| 8,103,586 B2 | 1/2012 | Doran et al. |
| 8,152,060 B2 | 4/2012 | Wolfe |
| 8,152,061 B2 | 4/2012 | Wolfe |
| 8,175,965 B2 | 5/2012 | Moore et al. |
| 8,229,851 B2 | 7/2012 | Doran et al. |
| 8,332,313 B2 | 12/2012 | Doran et al. |
| 8,438,073 B2 | 5/2013 | White |
| 8,447,650 B2 | 5/2013 | Postrel |
| 8,485,890 B2 | 7/2013 | Gagner et al. |
| 8,489,452 B1 | 7/2013 | Warner et al. |
| 8,494,956 B2 | 7/2013 | Tulluri et al. |
| 8,500,007 B2 | 8/2013 | Wolfe |
| 8,503,641 B2 | 8/2013 | Bushey |
| 8,504,473 B2 | 8/2013 | Paintin |
| 8,515,808 B2 | 8/2013 | Postrel |
| 8,528,814 B2 | 9/2013 | Wolfe |
| 8,528,828 B2 | 9/2013 | Fleischer et al. |
| 8,533,036 B2 | 9/2013 | Shukla |
| 8,533,037 B2 | 9/2013 | Postrel |
| 8,556,707 B2 | 10/2013 | Potts et al. |
| 8,566,169 B2 | 10/2013 | Bohanan et al. |
| 8,571,983 B1 | 10/2013 | Blackhurst et al. |
| 8,589,267 B2 | 11/2013 | Hurst |
| 8,589,297 B2 | 11/2013 | Enzaldo |
| 8,595,074 B2 | 11/2013 | Sharma et al. |
| 8,600,807 B1 | 12/2013 | Postrel |
| 8,602,297 B2 | 12/2013 | Wilen |
| 8,612,290 B2 | 12/2013 | Postrel |
| 8,631,999 B2 | 1/2014 | Wolfe et al. |
| 8,660,944 B2 | 2/2014 | Liu et al. |
| 8,668,146 B1 | 3/2014 | McGhie et al. |
| 8,675,840 B2 | 3/2014 | Risafi et al. |
| 8,676,672 B2 | 3/2014 | Nelsen |
| 8,701,982 B2 | 4/2014 | Yankovich et al. |
| 8,701,991 B2 | 4/2014 | Wolfe |
| 8,712,854 B1 | 4/2014 | Rafferty et al. |
| 8,725,564 B2 | 5/2014 | Postrel |
| 8,733,637 B1 | 5/2014 | Cedeno |
| 8,751,294 B2 | 6/2014 | Bhattacharya et al. |
| 8,762,278 B2 | 6/2014 | Miller |
| 8,820,634 B2 | 9/2014 | Wolfe |
| 8,874,467 B2 | 10/2014 | Yahn et al. |
| 8,887,999 B2 | 11/2014 | Wolfe |
| 8,967,324 B2 | 3/2015 | White |
| 9,002,737 B2 | 4/2015 | Wilen |
| 9,064,268 B2 | 6/2015 | Larrick |
| 9,129,294 B2 | 9/2015 | Yahn |
| 2001/0001856 A1 | 5/2001 | Gould et al. |
| 2001/0007098 A1 | 7/2001 | Hinrichs et al. |
| 2001/0007983 A1 | 7/2001 | Lee |
| 2001/0011680 A1 | 8/2001 | Soltesz et al. |
| 2001/0023409 A1 | 9/2001 | Kell |
| 2001/0029484 A1 | 10/2001 | Schultz et al. |
| 2001/0051902 A1 | 12/2001 | Messner |
| 2002/0026423 A1 | 2/2002 | Maritzen et al. |
| 2002/0032605 A1 | 3/2002 | Lee |
| 2002/0032641 A1 | 3/2002 | Mendiola et al. |
| 2002/0046341 A1 | 4/2002 | Kazaks et al. |
| 2002/0065724 A1 | 5/2002 | Tsuruda |
| 2002/0072974 A1 | 6/2002 | Pugliese, III et al. |
| 2002/0082962 A1 | 6/2002 | Farris et al. |
| 2002/0082994 A1 | 6/2002 | Herziger |

(56) References Cited

U.S. PATENT DOCUMENTS

| | | |
|---|---|---|
| 2002/0085037 A1 | 7/2002 | Leavitt et al. |
| 2002/0087462 A1 | 7/2002 | Seifert et al. |
| 2002/0091603 A1 | 7/2002 | Steiger et al. |
| 2002/0100660 A1 | 8/2002 | Stieber et al. |
| 2002/0107738 A1 | 8/2002 | Beach et al. |
| 2002/0112162 A1 | 8/2002 | Cocotis et al. |
| 2002/0147683 A1 | 10/2002 | Capobianco et al. |
| 2002/0156676 A1 | 10/2002 | Ahrens et al. |
| 2002/0162895 A1 | 11/2002 | Neto |
| 2002/0174235 A1 | 11/2002 | Likourezos |
| 2002/0188511 A1 | 12/2002 | Johnson et al. |
| 2002/0194122 A1 | 12/2002 | Knox et al. |
| 2003/0024979 A1 | 2/2003 | Hansen et al. |
| 2003/0037041 A1 | 2/2003 | Hertz |
| 2003/0046231 A1 | 3/2003 | Wu |
| 2003/0046249 A1 | 3/2003 | Wu |
| 2003/0081824 A1 | 5/2003 | Mennie et al. |
| 2003/0130940 A1 | 7/2003 | Hansen et al. |
| 2003/0149662 A1 | 8/2003 | Shore |
| 2003/0168508 A1 | 9/2003 | Dallenbach et al. |
| 2003/0173405 A1 | 9/2003 | Wilz et al. |
| 2003/0216969 A1 | 11/2003 | Bauer et al. |
| 2003/0233318 A1 | 12/2003 | King et al. |
| 2004/0024700 A1 | 2/2004 | Petigny |
| 2004/0088252 A1 | 5/2004 | Jenny |
| 2004/0098740 A1 | 5/2004 | Maritzen et al. |
| 2005/0038737 A1 | 2/2005 | Norris |
| 2005/0108104 A1 | 5/2005 | Woo |
| 2005/0108155 A1 | 5/2005 | Gallagher et al. |
| 2005/0144074 A1 | 6/2005 | Fredregill et al. |
| 2005/0171902 A1 | 8/2005 | Nguyen |
| 2005/0203835 A1 | 9/2005 | Nhaissi et al. |
| 2005/0203836 A1 | 9/2005 | Woodward et al. |
| 2005/0227769 A1 | 10/2005 | Morrow et al. |
| 2006/0064379 A1 | 3/2006 | Doran |
| 2006/0089908 A1 | 4/2006 | Keohane et al. |
| 2006/0131387 A1 | 6/2006 | Hansen et al. |
| 2006/0207856 A1 | 9/2006 | Dean et al. |
| 2006/0249568 A1 | 11/2006 | Scanlon |
| 2006/0261149 A1 | 11/2006 | Tulluri et al. |
| 2006/0287970 A1 | 12/2006 | Chess et al. |
| 2006/0293965 A1 | 12/2006 | Burton |
| 2007/0089064 A1 | 4/2007 | Facemire et al. |
| 2007/0125620 A1 | 6/2007 | Sorenson et al. |
| 2007/0234223 A1 | 10/2007 | Leavitt et al. |
| 2008/0052182 A1 | 2/2008 | Marshall |
| 2008/0072145 A1 | 3/2008 | Blanchard et al. |
| 2008/0082972 A1 | 4/2008 | De Sutter et al. |
| 2008/0162299 A1 | 7/2008 | Gusler et al. |
| 2008/0163079 A1 | 7/2008 | Haug |
| 2008/0172623 A1 | 7/2008 | Roche et al. |
| 2008/0288400 A1 | 11/2008 | Panthaki et al. |
| 2009/0069051 A1 | 3/2009 | Jain et al. |
| 2009/0240624 A1 | 9/2009 | James et al. |
| 2009/0242626 A1* | 10/2009 | Jones .................. G06Q 20/18 453/58 |
| 2009/0265269 A1 | 10/2009 | Stoecker |
| 2009/0266880 A1 | 10/2009 | Gustin et al. |
| 2009/0302103 A1 | 12/2009 | Kolinski-Schultz |
| 2009/0307622 A1 | 12/2009 | Jalon et al. |
| 2009/0313358 A1 | 12/2009 | Shepherd et al. |
| 2009/0320106 A1 | 12/2009 | Jones |
| 2010/0038419 A1 | 2/2010 | Blake |
| 2010/0057612 A1 | 3/2010 | Wagenhals |
| 2010/0063906 A1 | 3/2010 | Nelsen |
| 2010/0082468 A1 | 4/2010 | Low |
| 2010/0122329 A1 | 5/2010 | Jakobsson et al. |
| 2010/0131413 A1 | 5/2010 | Kranzley et al. |
| 2010/0161487 A1 | 6/2010 | Patel et al. |
| 2010/0200654 A1 | 8/2010 | Wolfe et al. |
| 2011/0145109 A1 | 6/2011 | Watson |
| 2011/0184834 A1 | 7/2011 | Perrochon et al. |
| 2011/0225063 A1 | 9/2011 | Grunski et al. |
| 2011/0238549 A1 | 9/2011 | Poon |
| 2011/0264503 A1 | 10/2011 | Lanahan et al. |
| 2011/0282784 A1 | 11/2011 | Nelsen |
| 2012/0054049 A1 | 3/2012 | Hayes |
| 2012/0059736 A1 | 3/2012 | Bhattacharya |
| 2012/0109787 A1 | 5/2012 | Larrick et al. |
| 2012/0124496 A1 | 5/2012 | Rose et al. |
| 2012/0137235 A1 | 5/2012 | T S et al. |
| 2012/0143705 A1 | 6/2012 | Bhattacharya et al. |
| 2012/0156976 A1 | 6/2012 | Blake et al. |
| 2012/0173351 A1 | 7/2012 | Hanson et al. |
| 2012/0259698 A1 | 10/2012 | Yurow |
| 2012/0310848 A1 | 12/2012 | Gao et al. |
| 2012/0323787 A1 | 12/2012 | Nelsen |
| 2013/0065686 A1 | 3/2013 | LeMay et al. |
| 2013/0066735 A1 | 3/2013 | Llach |
| 2013/0080235 A1 | 3/2013 | Wolfe |
| 2013/0080325 A1 | 3/2013 | Schatt |
| 2013/0091055 A1 | 4/2013 | Doran et al. |
| 2013/0144732 A1 | 6/2013 | Rothschild |
| 2013/0159130 A1 | 6/2013 | Gaur et al. |
| 2013/0161153 A1 | 6/2013 | Saez et al. |
| 2013/0191178 A1 | 7/2013 | Thompson et al. |
| 2013/0191202 A1 | 7/2013 | Postrel |
| 2013/0204681 A1 | 8/2013 | Kraft et al. |
| 2013/0204686 A1 | 8/2013 | Roberts et al. |
| 2013/0204781 A1 | 8/2013 | Flitcroft et al. |
| 2013/0246209 A1 | 9/2013 | White |
| 2013/0254074 A1 | 9/2013 | Joa et al. |
| 2013/0254086 A1 | 9/2013 | Joa et al. |
| 2013/0254106 A1 | 9/2013 | Webber et al. |
| 2013/0268413 A1 | 10/2013 | Burr et al. |
| 2013/0275246 A1 | 10/2013 | Ramaratnam |
| 2013/0297473 A1 | 11/2013 | Wolfe |
| 2013/0304559 A1 | 11/2013 | Stone et al. |
| 2013/0304620 A1 | 11/2013 | Bhattacharya et al. |
| 2014/0006268 A1 | 1/2014 | Roberts et al. |
| 2014/0012647 A1 | 1/2014 | Hecht |
| 2014/0032328 A1 | 1/2014 | Greenfield |
| 2014/0046784 A1 | 2/2014 | Prakash et al. |
| 2014/0052525 A1 | 2/2014 | Postrel |
| 2014/0058868 A1 | 2/2014 | Sharma et al. |
| 2014/0081736 A1 | 3/2014 | Blackhurst et al. |
| 2014/0095218 A1 | 4/2014 | Golembeski |
| 2014/0100939 A1 | 4/2014 | Postrel |
| 2014/0108196 A1 | 4/2014 | Yankovich et al. |
| 2014/0122324 A1 | 5/2014 | Spier |
| 2014/0122327 A1 | 5/2014 | Aleles et al. |
| 2014/0122331 A1 | 5/2014 | Vaish et al. |
| 2014/0136351 A1 | 5/2014 | Lennon |
| 2014/0143089 A1 | 5/2014 | Campos et al. |
| 2014/0156511 A1 | 6/2014 | Ren |
| 2014/0156512 A1 | 6/2014 | Rahman et al. |
| 2014/0201012 A1 | 7/2014 | Doran et al. |
| 2014/0236841 A1 | 8/2014 | Tan et al. |
| 2014/0257958 A1 | 9/2014 | Andrews |
| 2014/0289111 A1 | 9/2014 | Doran et al. |
| 2014/0335770 A1 | 11/2014 | Martin |
| 2015/0012305 A1 | 1/2015 | Truskovsky et al. |
| 2015/0017611 A1 | 1/2015 | Moumneh |
| 2015/0025987 A1 | 1/2015 | Yahn et al. |
| 2015/0170124 A1 | 6/2015 | Sorenson et al. |
| 2015/0254707 A1 | 9/2015 | Larrick et al. |
| 2015/0278801 A1 | 10/2015 | Friedlander |
| 2015/0339894 A1 | 11/2015 | Ramachandran et al. |
| 2016/0125548 A1 | 5/2016 | Bowles et al. |
| 2016/0232609 A1 | 8/2016 | Lindemulder et al. |
| 2017/0011387 A1 | 1/2017 | Lennon et al. |
| 2017/0039559 A1 | 2/2017 | Frieden |
| 2017/0148001 A1 | 5/2017 | Stock |
| 2017/0323282 A1 | 11/2017 | Doran et al. |
| 2018/0000594 A1 | 1/2018 | Yahn |
| 2018/0365744 A1 | 12/2018 | Lennon et al. |

FOREIGN PATENT DOCUMENTS

| | | |
|---|---|---|
| CA | 2067987 | 11/1992 |
| CA | 2421308 | 3/2002 |
| CH | 680171 | 6/1992 |
| DE | 660354 | 5/1938 |
| DE | 2528735 | 9/1976 |

(56) References Cited

FOREIGN PATENT DOCUMENTS

| | | |
|---|---|---|
| DE | 3021327 | 12/1981 |
| DE | 3147603 | 6/1983 |
| EP | 0313294 | 4/1989 |
| EP | 0351217 | 1/1990 |
| EP | 0420163 | 4/1991 |
| EP | 0458610 | 11/1991 |
| EP | 0477722 | 4/1992 |
| EP | 0857579 | 8/1998 |
| EP | 2367150 | 4/1999 |
| EP | 0924662 | 6/1999 |
| EP | 0924664 | 6/1999 |
| EP | 0924665 | 6/1999 |
| EP | 1178448 | 6/2000 |
| EP | 2991050 A1 * 3/2016 ........... G07F 19/202 |
| FR | 20242254 | 2/1971 |
| FR | 2342531 | 9/1977 |
| GB | 958741 | 5/1964 |
| GB | 1564723 | 4/1980 |
| GB | 2095452 | 9/1982 |
| GB | 2121582 | 12/1983 |
| GB | 2153128 | 8/1985 |
| GB | 2188467 | 3/1986 |
| GB | 2175427 | 11/1986 |
| GB | 2186411 | 8/1987 |
| GB | 2198274 | 6/1988 |
| GB | 2223340 | 4/1990 |
| GB | 2223872 | 4/1990 |
| GB | 2255666 | 11/1992 |
| IE | 80670 | 11/1998 |
| JP | 5249892 | 4/1977 |
| JP | 5250296 | 4/1977 |
| JP | H01258092 | 10/1989 |
| JP | H01307891 | 12/1989 |
| JP | 2081193 | 3/1990 |
| JP | H0363795 | 3/1991 |
| JP | 4315288 | 4/1991 |
| JP | H0392994 | 4/1991 |
| JP | 4344995 | 5/1991 |
| JP | 3252795 | 11/1991 |
| JP | 2006301807 | 11/2006 |
| JP | 2007241925 | 9/2007 |
| JP | 2007257578 | 10/2007 |
| SE | 44244 | 6/1916 |
| SE | 8801851 | 11/1989 |
| SE | 44247 | 10/2016 |
| SE | 50250 | 11/2019 |
| WO | WO1994006101 | 3/1994 |
| WO | WO1994009440 | 4/1994 |
| WO | WO1995030215 | 11/1995 |
| WO | WO1996026508 | 8/1996 |
| WO | WO1996030877 | 10/1996 |
| WO | WO1998025241 | 6/1998 |
| WO | WO1998036521 | 8/1998 |
| WO | WO1999000772 | 1/1999 |
| WO | WO1999028830 | 6/1999 |
| WO | WO1999050785 | 10/1999 |
| WO | WO2000010138 | 2/2000 |
| WO | WO2000011568 | 3/2000 |
| WO | WO2000025507 | 5/2000 |
| WO | WO2000075889 | 12/2000 |
| WO | WO2001037172 | 5/2001 |
| WO | WO2001039093 | 5/2001 |
| WO | WO2001042945 | 6/2001 |
| WO | WO2001059722 | 8/2001 |
| WO | WO2001091035 | 11/2001 |
| WO | WO2002007071 | 1/2002 |
| WO | WO2002075680 | 9/2002 |
| WO | WO2003046845 | 6/2003 |
| WO | WO2003071386 | 8/2003 |
| WO | WO2003071387 | 8/2003 |
| WO | WO2003071495 | 8/2003 |
| WO | WO2008015637 | 2/2008 |
| WO | WO2008027324 | 3/2008 |
| WO | WO2017027235 A1 | 2/2017 |
| WO | WO2002009001 | 1/2020 |

OTHER PUBLICATIONS

"ACI Gift Cards, Inc. Launches Amazon Gift Codes on Demand," Sep. 5, 2008, available at http://www.reuters.com/article/2008/09/05/idus11420+05-sep-2008+bw2008905.

"Cash in your jar of change without paying fees to do it," Nov. 21, 2009, available at http://www.examiner.com/article/cash-your-jar-of-change-without-paying-fees-to-do-it.

1-800 Gift Certificate, http://www.800giftcertificate.com, accessed Feb. 16, 1999, 12 pages.

Australian Examination Report in Patent Application No. 2011323490, mailing date Sep. 2, 2014, 3 pages.

Australian Examination Report in Patent Application No. 2013242807, mailing date Feb. 4, 2015, 4 pages.

Australian Examination Report in Patent Application No. 2013242807, mailing date Jan. 14, 2016, 4 pages.

Australian Examination Report in Patent Application No. 2013217290, mailing date Apr. 17, 2015, 3 pages.

Bedienungsanleitung CDS 500/MCC 500, 1991, 9 pages.

Canadian Further Examiner's Report for Canadian Application No. 2476502, Mail Date Apr. 29, 2015, 11 pages.

Canada Examiner's Report for Canadian Application No. 2,476,467, mail date Feb. 1, 2016.

Canada Examiner's Report for Canadian Application No. 2815428, Mail Date Jan. 26, 2015, 4 pages.

Canada Examiner's Report for Canadian Application No. 2815428, Mail Date Feb. 1, 2016, 4 pages.

Canada Examiner's Report for Canadian Application No. 2829462, Mail Date Apr. 30, 2015, 4 pages.

Canada Examiner's Report for Canadian Application No. 2829462, Mail Date Apr. 12, 2016, 11 pages.

Canada Examiner's Report for Canadian Application No. 2883258, Mail Date Feb. 15, 2016, 10 pages.

Cash, M., "Bank blends new technology with service", *Winnepeg Free Press*, Sep. 4, 1992, 1 page.

Corrected Notice of Allowance for U.S. Appl. No. 10/558,907, Mailed Feb. 8, 2018, 19 pages.

Extended European Search Report for European Application No. 15160491.5, mailing date Jul. 28, 2015, 5 pages.

Extended European Search Report for European Patent Application No. 13192796.4, mailing date Sep. 3, 2015, 6 pages.

Extended European Search Report for European Patent Application No. 11838698.6, mailing date Apr. 11, 2016, 8 pages.

F. Zimmerman & Co., "Reference Manual Contovit/Sortovit, Perconta Money Counting and Sorting Systems", Aug. 1995, pp. I-III, 1-31, and three pages of specifications.

Final Office Action for U.S. Appl. No. 13/367,129, Mail Date May 13, 2015, 30 pages.

Final Office Action for U.S. Appl. No. 14/258,591, mailing date Aug. 4, 2015, 17 pages.

Final Office Action for U.S. Appl. No. 14/145,140, mailing date Aug. 10, 2015, 21 pages.

Final Office Action for U.S. Appl. No. 13/790,674, mailing date Oct. 28, 2015, 29 pages.

Final Office Action for U.S. Appl. No. 11/294,637, mailing date Feb. 5, 2016, 45 pages.

Final Office Action for U.S. Appl. No. 13/790,674, mailed Oct. 31, 2016, 29 pages.

Final Office Action for U.S. Appl. No. 14/145,140, mailing date May 9, 2017, 24 pages.

Final Office Action for U.S. Appl. No. 14/887,502, mailed Jun. 14, 2019, 34 pages.

First USA: First USA Introduces the Gift Card: Pre-Paid Visa Card Works Better than a Gift Certificate, Business Editors, Nov. 12, 1998, 3 pages.

Fri Kopenskap articles, Mar. 18, 1988, Apr. 27, 1989 and Nov. 25, 1988, 6 pages.

Geldinstitute Literature, Mar. 1990 and Apr.-May 1992, 2 pages.

Gift Certificate Express, http://www.giftcertificateexpress.com, accessed Feb. 16, 1999, 10 pages.

Hamilton, "Turning Cans into Cold Cash", *The Washington Post*, Jul. 2, 1991, pp. D1, D4, pp. 194-209.

(56) References Cited

OTHER PUBLICATIONS

International Search Report and Written Opinion in International Application No. PCT/US16/13149, mailing date Apr. 25, 2016, 7 pages.
International Search Report and Written Opinion in International Application No. PCT/US16/38300, mailing date Sep. 13, 2016, 9 pages.
International Search Report and Written Opinion in International Application No. PCT/US2016/044964, mailing date Oct. 20, 2016, 10 pages.
Leitch, C., "High-tech bank counts coins," *Innovations*, Report on Business, Sep. 18, 1991, 1 page.
Llemeon, J., "Royal's Burlington drive-in bank provides customers 24-hour tellers," *Business Today, The Toronto Star*, Aug. 21, 1991, 1 page.
NCR, "NCR 7401 Retail Self-Service Solution," 1999, 2 pages.
NCR, "NCR 7800 Consumer Price Verifier," http://www3.ncr.com/product/retail/product/catalog/7800.shtml, accessed Mar. 18, 1999, pp. 1-2.
Non-Final Office Action for U.S. Appl. No. 14/312,393, mailed Aug. 25, 2016, 35 pages.
Non-Final Office Action for U.S. Appl. No. 13/679,383, mailing date Aug. 19, 2015, 16 pages.
Non-Final Office Action for U.S. Appl. No. 11/294,637, Mail Date Apr. 25, 2015, 33 pages.
Non-Final Office Action for U.S. Appl. No. 13/790,674, Mail Date May 7, 2015, 27 pages.
Non-Final Office Action for U.S. Appl. No. 13/790,674, mail date Nov. 9, 2017, 24 pages.
Non-Final Office Action for U.S. Appl. No. 13/790,674, Mail Date Jul. 14, 2016, 27 pages.
Non-Final Office Action; U.S. Appl. No. 13/679,383; Mailed on Oct. 1, 2014; 13 pages.
Non-Final Office Action; U.S. Appl. No. 14/145,140; Mailed on Nov. 6, 2014; 14 pages.
Non-Final Office Action: U.S. Appl. No. 14/794,603; Mailed Nov. 14, 2017; 10 pages.
Non-Final Office Action for U.S. Appl. No. 13/728,905, mailing date Jul. 31, 15, 23 pages.
Non-Final Office Action for U.S. Appl. No. 14/258,591, mailing date Feb. 12, 16, 19 pages.
Non-Final Office Action for U.S. Appl. No. 14/507,636, mailed Oct. 27, 16, 27 pages.
Notice of Allowance for U.S. Appl. No. 13/367,129, Mailed Jul. 10, 15, 17 pages.
Notice of Allowance for U.S. Appl. No. 14/507,636, Mailed Jun. 16, 2017, 19 pages.
Notice of Allowance for U.S. Appl. No. 10/558,907, Mailed Jan. 26, 2018, 21 pages.
Notice of Allowance for U.S. Appl. No. 15/705,915, Mailed Aug. 15, 2019, 26 pages.
Oxby, M., "Royal Bank opens 'super branch'", *The Gazette Montreal*, Sep. 14, 1991, 1 page.
Patent Examination Report No. 1 in Australian Patent Application No. 2015201150, mailing date Mar. 18, 2016, 7 pages.
QUORA, "Why don't retailers buy back their own gift cards at a discount?" 2013. Retrieved from the internet on Aug. 19, 2016 at <https://www.quora.com/Why-don't-retailers-buy-back-their-own-gift-cards-at-a-discount>.
Reis Eurosystems Geldbearbeitungssysteme, "Test-Programme CS 3110 Selectronic coin sorting and counting machine," Jul. 1992, pp. 1-3.
Reis Eurosystems, "Operating Instructions CS 3110 Selectronic Coin Sorting and Counting Machine With Central Sensor", Jul. 1992, pp. 1-12, I-IV.
Slide Changing Apparatus With Slide Jam Protection, Research Disclosure 30509 Sep. 1989, 3 pages.
Spectrum One, "Spectrum One? Network Solutions For Wireless Data Capture," <http://www.symbol.com/ST0000129.HTM>, accessed Mar. 18, 1999, pp. 1-5.
Super Branch Literature, Feb. 1992, 2 pages.
SymbolSolutions, "Supermarket Buys Two Solutions for the Price of One," http://www.symbol.com/solution/017SS.HTM, accessed Mar. 18, 1999, pp. 1-3.
Translated Article from Praktiskt Butiksarbete, Sep. 1992, 2 pages.
Non-Final Office Action mailed Jul. 13, 2016 in U.S. Appl. No. 14/145,140.
Non-Final Office Action mailed Jul. 14, 2016 in U.S. Appl. No. 13/790,674.
Final Office Action mailed Sep. 9, 2016 in U.S. Appl. No. 14/258,591.
Final Office Action mailed Jul. 8, 2016 in U.S. Appl. No. 13/679,383.
PCT International Search Report and Written Opinion for PCT Application No. PCT/US2021/031414, mailed Aug. 10, 2021, 10 pages.

* cited by examiner

Step 1: (a) NETWORK sends deposit for prior day credits (b) NETWORK sends deposit for prior day interchange.
Step 2: Financial Institution receives NETWORK deposits and reconciles NETWORK activity per existing network process.

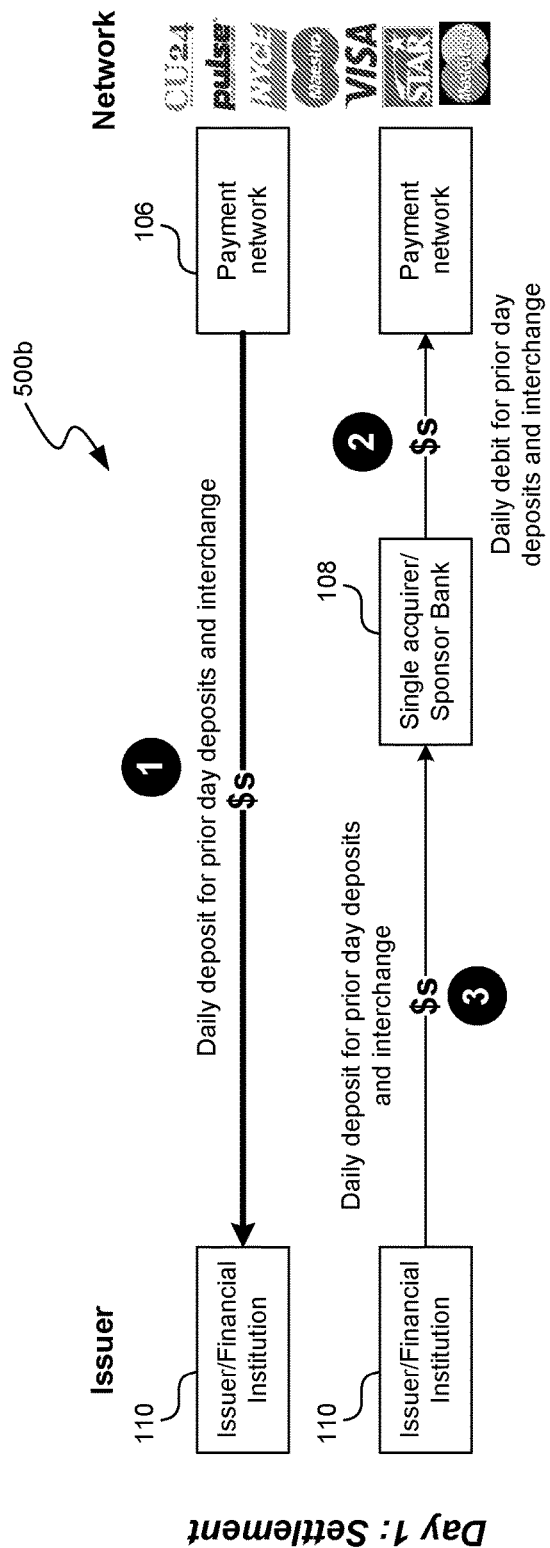

(1) The issuer is paid by the network, (2) the acquirer (sponsor bank) pays the network, and (3) the issuer pays the acquirer.
Goal: Allow for single acquirer, but reimburse acquirer daily for originating the disbursements.

1. The Payment Network deposits to the Issuer the
   a. aggregate coins dumped prior day that resulted in PINless deposit instructions
   b. aggregate interchange / reimbursement fees from the PINless deposits
2. The Payment Network debits the acquirer:
   a. The aggregate PINless deposits originated prior day (1.a above)
   b. The aggregate interchange fees from the PINless deposits (1.b above)
3. The acquirer debits the issuer for:
   a. The aggregate PINless deposits originated prior day (1.a above)
   b. The aggregate interchange fees from the PINless deposits (1.b above)

Periodically, the Coin Kiosk Operator services coin kiosks, removing coins, and pays the Issuer.

*FIG. 5B*

KIOSK-BASED SYSTEMS AND METHODS FOR DIRECT DEPOSIT OF COIN AND/OR OTHER CASH VALUE

CROSS-REFERENCE TO RELATED APPLICATION(S)

The present application claims priority to U.S. Provisional Patent Application No. 63/022,381, titled KIOSK-BASED SYSTEMS AND METHODS FOR DIRECT DEPOSIT OF COIN AND/OR OTHER CASH VALUE, filed May 8, 2020, the disclosure of which is incorporated herein by reference in its entirety.

TECHNICAL FIELD

The present disclosure is generally related to kiosk-based systems and methods for direct deposit of coin value and/or other funds into an account at a financial institution.

BACKGROUND

People often accumulate loose change in containers or drawers in their home or office. Once they have collected a sufficient quantity of coins, they can dispose of them in a number of different ways. For example, they can take their coins to a local bank, but some banks require that coins be counted and rolled before they can be deposited or exchanged for cash. Other banks may charge a small fee for counting and depositing coins.

People can also exchange their coins for cash vouchers at a consumer operated coin counting kiosk. Coinstar, LLC, for example, operates a network of consumer operated coin counting kiosks located in retail stores, banks, and other publicly accessible areas. The kiosks count loose coins and dispense vouchers that can be redeemed for cash. If the kiosk is located in a bank setting, the user can take the voucher to a bank teller to have the voucher value deposited in an account. Although there may be a service fee if the user elects to receive a cash voucher, many of the kiosks also offer other products and services, such as e-certificates, gift cards, etc. that usually do not have a fee.

Although consumer operated coin counting kiosks provide an efficient way for consumers to recycle their coins, some consumers may be hesitant to use such kiosks. This may be because of an associated fee, or because none of the kiosk products appeal to these consumers. Accordingly, it would be advantageous to provide consumers with new ways to capture the value of their loose coins.

BRIEF DESCRIPTION OF THE DRAWINGS

FIGS. 5A and 5B are diagrams illustrating process flows for depositing consumer coin value and/or other funds into an account at a financial institution, in accordance with other embodiments of the present technology.

DETAILED DESCRIPTION

Figure 1:
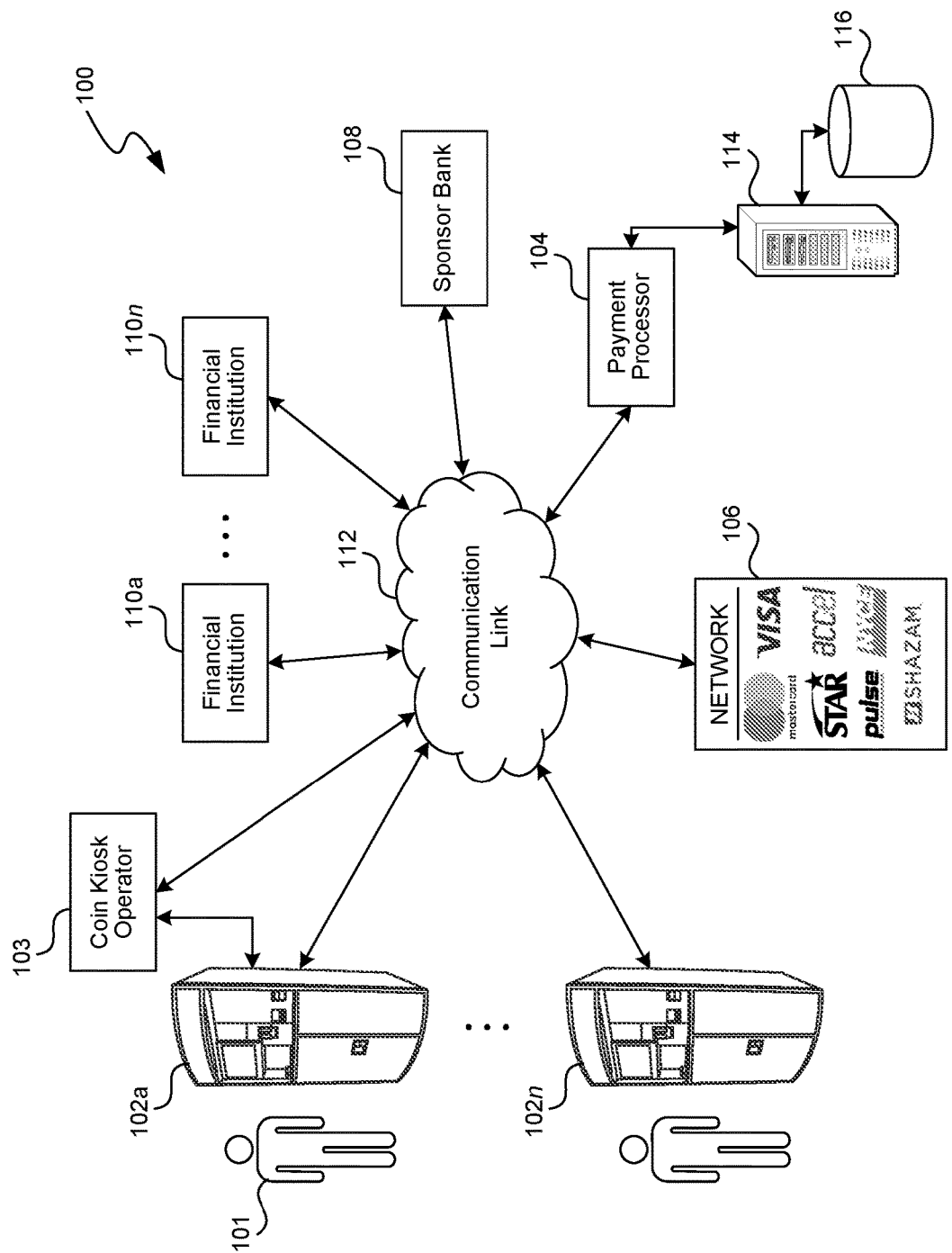
FIG. 1 is a schematic diagram illustrating components of a suitable network environment for enabling consumers to deposit coin value and/or other funds in an account at a financial institution, in accordance with embodiments of the present technology.

The following disclosure describes various embodiments of systems and methods that enable users to deposit the value of their loose coins (and/or paper cash, etc.) into one or more accounts at a bank or other financial institution. For example, in some embodiments, the systems and methods described herein enable a consumer to put a batch of loose coins into a coin counting kiosk and have the coin value deposited directly into one of the consumer's accounts (e.g., a debit card account, credit card account, savings account, checking account, etc.) by swiping their bank card through (or inserting their bank card into) a card reader at the kiosk and selecting the desired transaction. Accordingly, embodiments of the present technology can enable consumers and other users to directly deposit coin value into one or more of their accounts that can be identified via an associated bank card. Such embodiments can provide advantages over existing systems that may only provide limited options for deposit of consumer coin value and/or require additional steps to facilitate such deposits.

Certain details are set forth in the following description and in FIGS. 1-7 to provide a thorough understanding of various embodiments of the present technology. In other instances, well-known structures, materials, operations and/or systems often associated with consumer operated coin counting kiosks, networked computer systems, processing devices, software, financial institutions and the Automated Clearing House (ACH) network are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention. Additionally, the details, dimensions, angles and other features shown in the Figures are merely illustrative of particular embodiments of the disclosure. Accordingly, other embodiments can have other details, dimensions, angles and features without departing from the spirit or scope of the present invention. Those of ordinary skill in the art will also appreciate that further embodiments of the invention can be practiced without several of the details described below.

In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

FIG. 1 is a schematic diagram of a suitable network environment 100 in which various embodiments of the present technology can be implemented. In the illustrated embodiment, the environment 100 includes a plurality of consumer operated coin counting kiosks 102 (identified individually as kiosks 102a-102n) that can be operably connected to one or more remote computers or other processing devices in the environment 100 via a communication link 112. The communication link 112 can include one or more wired or wireless networks such as, but not limited to, the Internet, an intranet, a Local Area Network (LAN), a Wide Area Network (WAN), a Wireless Local Area Network (WLAN), a Wireless Wide Area Network (WWAN), LTE networks, the Global System for Mobile Communications (GSM), etc. Additionally, the communications link 112 can utilize one or more messaging protocols such as, for example, TCP/IP, SMS, MMS, XMPP, RTMP, and/or any other wired or wireless data network or messaging protocols. Although the communication link 112 can include a publicly available network (e.g., the Internet), the kiosks 102 can also connect to and communicate with the various remote devices in the environment 100 through a private communication link, such as an intranet or other wired or wireless communication network. Additionally, although not illustrated in FIG. 1, in various embodiments the individual kiosks 102 can be connected to a host computer that facilitates the exchange of information between the kiosk 102 and the other processing devices in the environment 100.

In some embodiments, the environment 100 also includes a kiosk operator 103, a payment processor 104, a network 106, a sponsor bank 108, and a plurality of financial institutions 110 (identified individually as financial institutions 110a-110n). The kiosk operator 103 is responsible for operating and maintaining the kiosks 102 and can include a central processing center that is operably connected to each of the kiosks 102. In some embodiments, the central processing center can act as a hub that receives transaction data from the kiosks 102 and sends it to other entities in the environment 100 as necessary to implement the methods described herein. As described in greater detail below, the payment processor 104 can be a conventional payment processor that receives cardholder information and other transaction information from the kiosks 102 and routes the information to the network 106. The network 106 includes entities that provide credit, debit, and prepaid card brands and operate networks that process card transactions worldwide. Well known examples of such entities include Visa®, Mastercard®, STAR®, Discover®, etc. In some embodiments, the network 106 follows proprietary operating rules and regulations for the card industry and provides the infrastructure for interchange, clearing, and settlement of card-based transactions. In some embodiments, the sponsor bank 108 (which can also be referred to as an "acquiring bank") can be responsible for paying the network 106 for disbursement transactions as described in further detail below. Accordingly, in some embodiments, the sponsor bank 108 and the payment processor 104 can together be referred to as the "acquirer."

In some embodiments, the financial institutions 110 can include banks and credit unions that issue cards (e.g., debit cards, credit cards, prepaid cards, etc.) to consumers and maintain the associated consumer accounts. Accordingly, the financial institutions 110 can also be referred to as "issuers." In addition to issuing cards, the financial institutions 110 also provide authentication and authorization regarding whether the cards are valid and have available balances. Examples of the financial institutions 110 can include Chase®, Bank of America®, U.S. Bank®, etc.

As those of ordinary skill in the art will appreciate, each of the entities described above with reference to FIG. 1 can include and/or be operably connected to one or more server computers and/or other processing devices for performing the various functions associated with the particular entities. For example, in some embodiments, the payment processor 104 can be operably connected to a server 114, which in turn can be operably connected to one or more databases 116. The payment processor server 114 can perform many or all the functions for receiving, routing and storing electronic messages, data, and/or other information necessary to perform the functions of the payment processor 104. For example, the server 114 can retrieve content from and exchange content with the database 116. Such content can include, for example, information related to various direct deposit transactions as described herein. The server 114 can include a server engine, a content management component, a database management component, and/or other components typically found on conventional server devices. The server engine can perform the basic processing and operating system level tasks associated with the various technologies described herein. The content management component can handle many of the functions associated with the processes described herein, and the database management component can perform various storage, retrieval and query tasks associated with the database 116. Although the payment processor server 114 and the associated database 116 are described herein by way of example, it will be understood by those of ordinary skill in the art that each of the kiosk operator 103, the network 106, the sponsor bank 108, the individual financial institutions 110, as well as other entities in the environment 100 can also include and/or be operably connected to one or more servers, databases, and/or other processing/storage devices to perform the functions associated with the individual entities in a similar manner.

Although not shown in FIG. 1, those of ordinary skill in the art will understand that embodiments of the environment 100 can further include and/or be connectable to other entities/processing devices for obtaining or exchanging data and information, such as other financial institutions for reconciling deposits (e.g., banks, credit/debit card providers, accounting clearing houses), other service providers, merchants, manufacturers, authorities, government agencies, etc., as necessary to implement the methods and systems described herein. The financial institutions can include all manner of entities associated with conducting financial transactions, including banks, credit/debit card facilities, online commerce facilities, online payment systems, virtual cash systems, money transfer systems, etc. Additionally, in some embodiments, the kiosks 102, the financial institutions 110, and/or other entities in the environment 100 can be connected to other user devices, such as user devices having associated browsers (e.g., smartphones, personal computers, laptops, etc.).

The various entities, components, and arrangements depicted in FIG. 1 are merely illustrative of some embodiments of the present technology. Aspects of the invention may be practiced in a variety of other computing environments including additional or other entities. Additionally, in other embodiments the environment 100 may lack one or more of the entities shown in FIG. 1.

Figure 2:
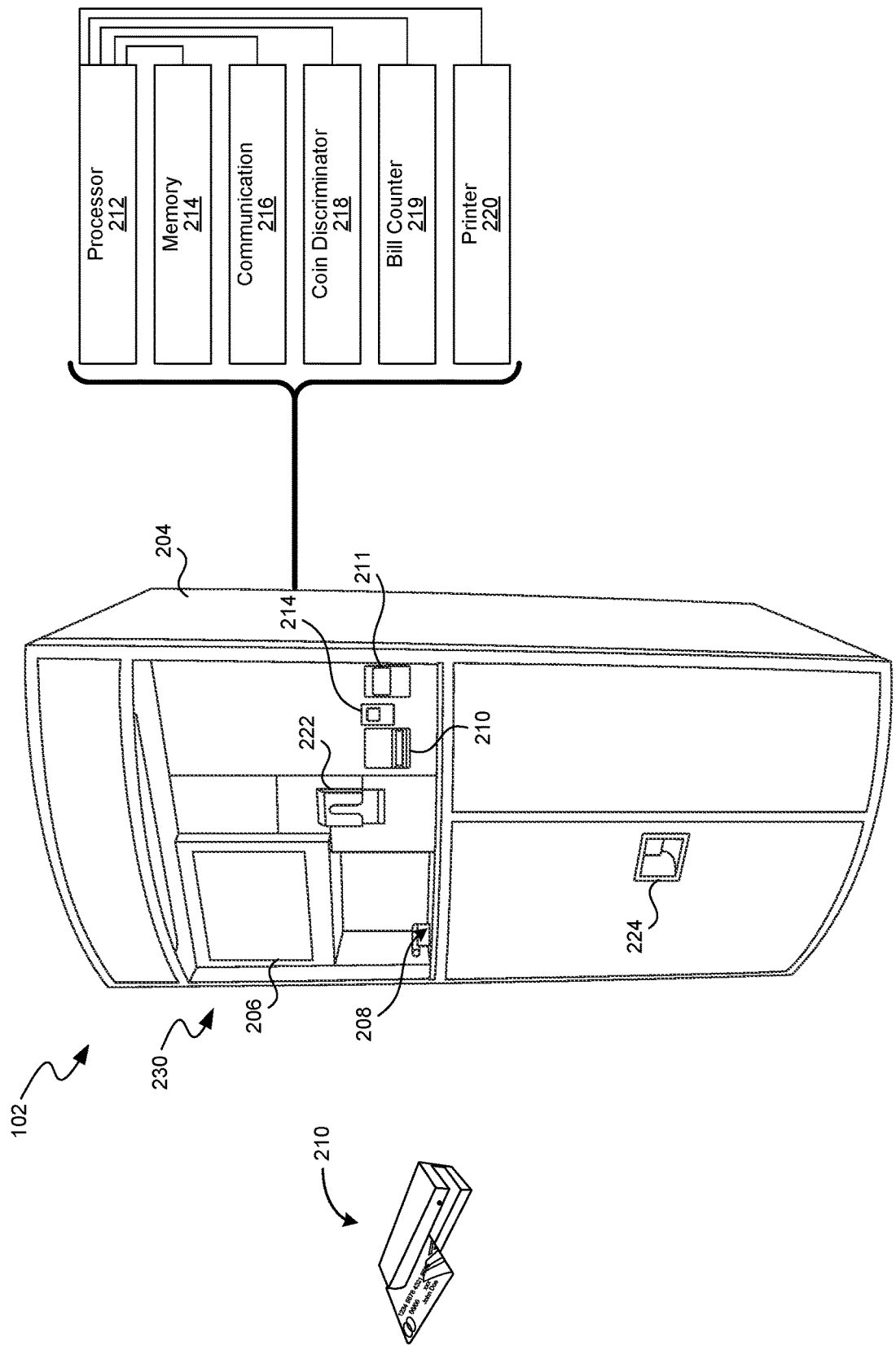
FIG. 2 is a partially schematic isometric view of a consumer operated coin counting kiosk configured in accordance with embodiments of the present technology.

FIG. 2 is a partially schematic isometric view of one of the kiosks 102a-102n of FIG. 1 configured in accordance with embodiments of the present technology. The kiosks 102a-102n can be consumer operated coin counting kiosks that are located in, for example, banks, retail outlets (e.g., grocery stores, drug stores, etc.), and/or other publicly accessible areas. In some embodiments, all the kiosks 102 can be at least generally similar in structure and function. In other embodiments, the kiosks 102 may differ from each other in various structures and/or functions.

In the illustrated embodiment, the kiosk 102 includes a housing 204 that includes a user interface 230. The user interface 230 can include a display screen 206 and/or a keypad (not shown). The display screen 206 can provide a graphical user interface that presents prompts and other textual and graphical information to users (e.g., a user 101 as shown in FIG. 1) and can include a touch screen or touch pad with which users can input information (e.g., desired selections, user IDs, passwords, unique codes, etc.) in response to visual prompts displayed on the display screen 206. If a keypad is provided, it can include a plurality of tactile buttons that users can select to input information in response to the prompts displayed on the screen 206.

The kiosk 102 includes a coin input region 208 in which users can pour or otherwise place a plurality of randomly oriented loose coins for counting by the kiosk 102. In the illustrated embodiment, the coin input region 208 includes a hinged tray in which the user can dump their coins and then lift one side of the tray to cause the coins to flow into the kiosk 102. In other embodiments, other types of coin input devices and systems can be included with the kiosk 102. The kiosk 102 can house a coin discriminator 218 (shown schematically) that receives the coins from the input tray for discriminating and counting to determine a total value. In the illustrated embodiment, the kiosk 102 additionally houses a printer 220 (also shown schematically) for printing vouchers, coupons, receipts and/or other printed indicia associated with coin counting transactions that are dispensed to the user via an outlet 222. In some embodiments, the user can supplement the coin value by providing additional funds to the kiosk. For example, the user can provide cash funds (e.g., paper money/bills) via a bill acceptor 211 (having, e.g., a bill slot). The kiosk 102 can also include a bill counter 219 for discriminating and counting paper money received via the bill accepter 211 to determine a total value. In some embodiments, the coin input region 208 and the bill acceptor 211 can be collectively referred to herein as a "funds input portion," and the coin discriminator 218 and the bill counter 219 can be collectively referred to as a "funds counting portion."

The kiosk 102 also includes a card reader 210 configured to read data from cards (e.g., debit cards, credit cards, prepaid cards, other bank cards, etc.; also referred to herein as "bank card" or "bank cards"). For example, in some embodiments the card reader 210 can be a conventional card reader having a card slot. When a consumer or other cardholder swipes their card through the slot on the reader 210, the reader 210 reads information off a storage medium (e.g., a magnetic stripe) on the card in a conventional manner. In other embodiments, the card reader 210 can be a conventional card reader having a card slot that the cardholder inserts their card into so that the information can be read off the storage medium. The information that is read off the card can include, for example, a Bank Identification Number (BIN), which identifies the financial institution (e.g., a bank or credit union) that issued the card and the associated account or accounts at the financial institution. Other information contained on the card, or obtainable via the information contained on the card, can include cardholder identification information. The information can be stored on the card using various types of storage media including, for example, magnetic media, optical media, etc.

In addition to the foregoing features, the kiosk 102 can further include a processor 212 (e.g., a CPU), memory 214, and a communication facility 216. The processor 212 can provide information and instructions to kiosk users via the display screen 206 and/or an associated audio system (e.g., a speaker; not shown). The processor 212 can also receive user inputs via, e.g., a touch screen associated with the display screen 206, a physical keypad, and/or a microphone. The processor 212 can control the operation of the various electronic and electromechanical components of the kiosk 102 in accordance with computer readable instructions stored on the memory 214. The processor 212 may be any logic processing unit, such as one or more CPUs, digital signal processors (DSPs), application-specific integrated circuits (ASICs), etc. The processor 212 may be a single processing unit or multiple processing units in a device or distributed across multiple devices. The processor 212 is connected to the memory 214 and may be coupled to other hardware devices, for example, with the use of a bus (e.g., a PCI Express or Serial ATA bus). The processor 212 can include, by way of example, a standard personal computer ("PC") (e.g., a DELL OPTIPLEX 780 or 7010 PC) or other type of embedded computer running any suitable operating system, such as Linux, Windows, Android, iOS, MAC OS, or an embedded real-time operating system. In some embodiments, the processor 212 can be a small form factor PC with integrated hard disk drive ("HDD") or solid-state drive ("SSD") and universal serial bus ("USB") or other ports to communicate with the other components of the kiosk 102. The memory 214 can include read-only memory (ROM) and random access memory (RAM) or other storage devices, such as disk drives or SSDs, that store the executable applications, test software, databases and other software required to, for example, implement the various routines described herein, control kiosk components, process information and data, communicate and exchange data and information with remote computers and other devices, etc.

The kiosk 102 can communicate with remote processing devices (e.g., remote servers, processors, user devices, etc.) via the communication facility 216. The communication facility 216 can include a network connection (e.g., a wired connection, such as an Ethernet port, cable modem, FireWire cable, Lightning connector, USB port, etc.) and/or a wireless transceiver (e.g., including a Wi-Fi access point, Bluetooth transceiver, near-field communication (NFC) device, and/or wireless modem or cellular radio utilizing GSM, CDMA, 3G, 4G and/or 5G technologies) suitable for communication with, e.g., all manner of remote processing devices via, e.g., the communication link 112 and/or directly via, e.g., a wireless peer-to-peer connection. The kiosk 102 and/or various components and systems thereof can be at least generally similar in structure and function to the kiosks and corresponding kiosk components and systems described in the following U.S. patents and patent applications, each of which is incorporated herein by reference in its entirety: U.S. patent application Ser. Nos. 13/671,299, 13/367,129, 13/728,905, 13/790,674, 14/312,393, 14/617,672, 14/674,860, 14/794,603, 14/887,502, 14/946,678, 14/948,005, and 16/854,761; and U.S. Pat. Nos. 5,564,546, 5,620,079, 6,056, 104, 5,842,916, 6,116,402, 6,349,972, 8,033,375, 7,653,599, 7,865,432, 7,014,108, 9,064,268, 8,874,467, 8,967,361 and 9,022,841.

Figure 3A:
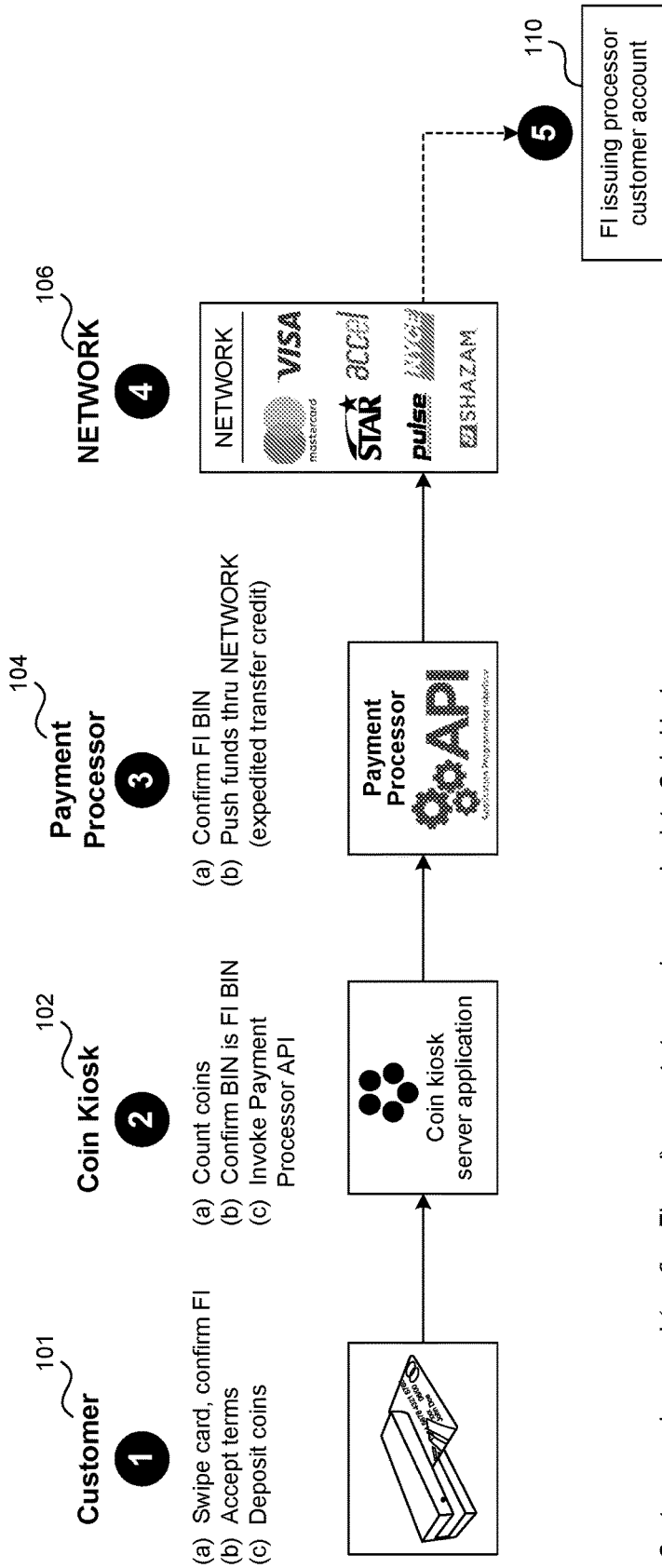
FIGS. 3A-3G are a series of diagrams illustrating process flows for depositing consumer coin value and/or other funds into an account at a financial institution, in accordance with embodiments of the present technology.

FIGS. 3A-3G are a series of diagrams illustrating process flows 300a-300g for depositing monetary value (e.g., coin value and/or paper cash value) into a user account (e.g., a debit card account) using the environment 100 of FIG. 1 in accordance with embodiments of the present technology. For clarity, the various steps in the process flows 300a-300g are generally labeled in the corresponding diagram by a black dot with a white integer, and are also generally reproduced textually below the diagram. Referring first to FIG. 3A together with FIGS. 1 and 2, the process flow 300a illustrates a process for crediting customer coin value to a financial institution account of the customer at Day 0. At step 1, the customer 101 (which may also be referred to as an FI customer or "financial institution" customer, user, consumer, member, etc.) approaches the kiosk 102 and selects the desired transaction (e.g., to deposit their coin value into an account) by selecting the appropriate button(s) or icons displayed on the display screen 206. The customer then swipes his or her bank card (e.g., a debit card) through the card reader 210 at the kiosk 102 and accepts the terms and conditions associated with the direct deposit transaction. In some embodiments, the terms and conditions can be displayed to the customer via the kiosk display screen 206, and the user can accept the terms and/or confirm the financial institution associated with the card by making the appropriate selections on the screen. Notably, in some embodiments the user can perform the direct deposit transaction without having to enter a unique code (e.g., a numeric code, alphanumeric code, etc.) such as a personal identification number (PIN) associated with their account at the kiosk. After swiping their card and accepting the terms, the customer 101 pours or otherwise deposits their coins into the coin input region 208 of the kiosk 102. In those embodiments in which the coin input region 208 includes a hinged coin input tray, the customer can lift one end of the tray to cause the coins therein to slide into the coin discriminator 218 for counting. In some embodiments, the user can input paper bills into the kiosk 102 via the bill acceptor 211 instead of, or to supplement, the coin value. Accordingly, although aspects of embodiments of the present technology are described herein in the context of coin deposits, it will be understood that such description also applies to deposits of other cash value (e.g., paper cash) via the kiosk 102 in addition to, or instead of, coin value, unless the text expressly states otherwise.

Step 2 is performed by the kiosk 102 and/or the kiosk operator 103. In step 2, the coin discriminator 218 receives the coins deposited by the user in step 1 and counts them to determine a total value. In embodiments in which the user deposited paper money, the bill counter 219 counts the bills to determine the value and adds it to the coin value, if any. Further in step 2, the kiosk card reader 210 reads the information off the customer's card (e.g., off the magstripe on the card). This information typically includes a BIN, and upon reading the BIN the kiosk 102/kiosk operator 103 confirms that the BIN is associated with a financial institution (e.g., a financial institution that is available for direct deposits via the kiosk 102). After confirming the BIN, the kiosk 102/kiosk operator 103 invokes a payment processor Application Programing Interface (API) to communicate with the payment processor 104 and initiate the crediting of the customer's coin value to the customer's account. In addition to reading the BIN off the card, the kiosk 102/kiosk operator 103 also obtains additional information associated with the card, the customer, and/or the customer account including, for example, the card expiration date, the customer's first and last names, the card account number, etc. This information can be read off the card or obtained from a database based on information read off the card. After invoking the payment processor API, the kiosk 102/kiosk operator 103 sends the BIN and the other transaction information to the payment processor 104 via the communication link 112. The other transaction information can include, for example, the coin deposit amount and the kiosk location, as well as the card expiration date, the first and last names of the user, the account number, etc. In some embodiments, the kiosk 102 (and/or the card reader 210) can encrypt all or a portion of this information (e.g. the account number, the first and last names of the user, etc.) before sending it to the payment processor 104.

At step 3, the payment processor 104 receives the transaction information from the kiosk 102 and confirms the BIN of the financial institution. After confirming the BIN and decrypting the encrypted information, the payment processor 104 routes the transaction information (e.g., as an expedited transfer credit) to the network 106. At step 4, the network 106 routes the transaction information to the financial institution 110 to credit the customer's account. At step 5, the financial institution 110 responds to the expedited transfer instruction from the network 106 and credits the customer's account with the amount of the coin value deposited by the customer. In some embodiments, the customer's account can be credited with 100% of the coin value deposited at the kiosk 102. In other embodiments, the customer's account can be credited with less than the coin value. For example, in some embodiments, the customer's account may be credited with the full amount of the coin value less a small transaction charge or fee, which may be a small percentage of the total coin value or a flat fee. Either way, in the process flow 300a, the financial institution 110 credits funds to the customer's account. In some embodiments, the funds deposited into the user's bank account are available to the user the same day the user initiated the deposit using the kiosk 102 (e.g., the funds are available immediately after, or shortly after (e.g., within a few minutes after) the user completes the transaction at the kiosk 102).

Figure 3B:
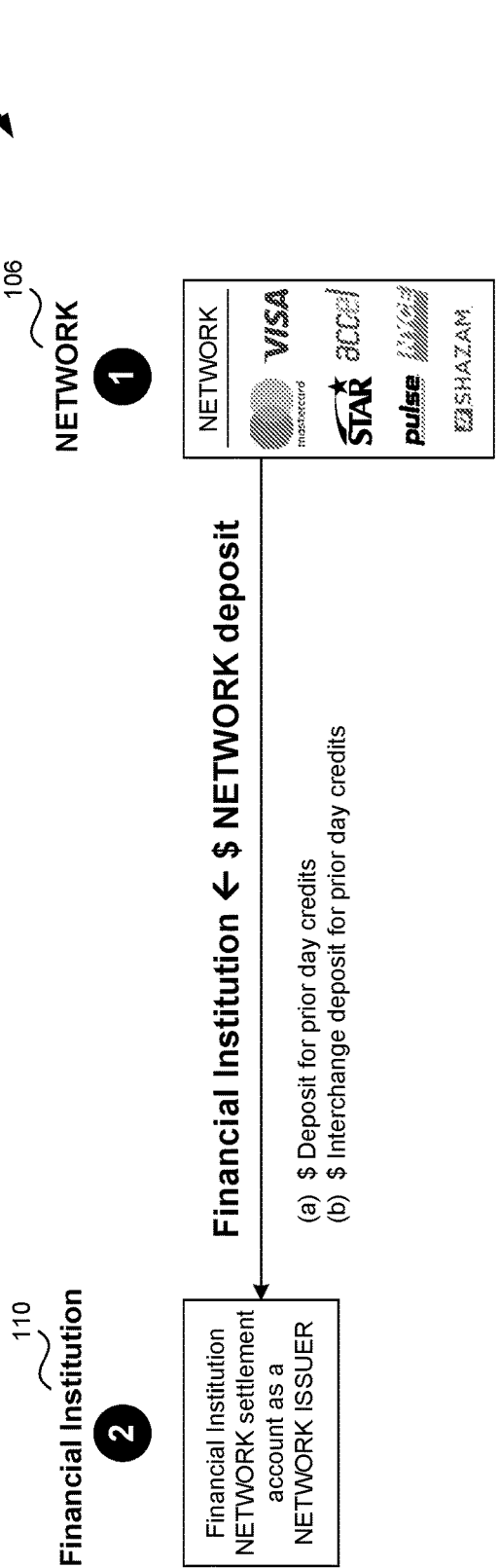

FIG. 3B is a diagram of the process flow 300b by which the network 106 settles with the financial institution 110 on Day 1. In this example, "Day 1" is the day following the coin deposit by the customer and can also be referred to as "settlement day." In step 1 of the process flow 300b, the network 106 sends a deposit for the prior day credit(s) and a deposit for any prior day interchange to the financial institution 110. The deposit for the prior day credit is equivalent to the coin value the financial institution 110 credited to the customer account on Day 0 (FIG. 3A). The "interchange" is a fee paid to the kiosk operator 103 for accepting the card-based deposit to the customer's account. In step 2 of the process flow 300b, the financial institution 110 receives the deposits from the network 106 and reconciles the network activity against their transaction reports according to the existing network process. Accordingly, in the embodiment of the process flow 300b, the network 106 settles with (e.g., transfers funds to) the financial institution 110 for the prior day credits and interchanges.

Figure 3C:
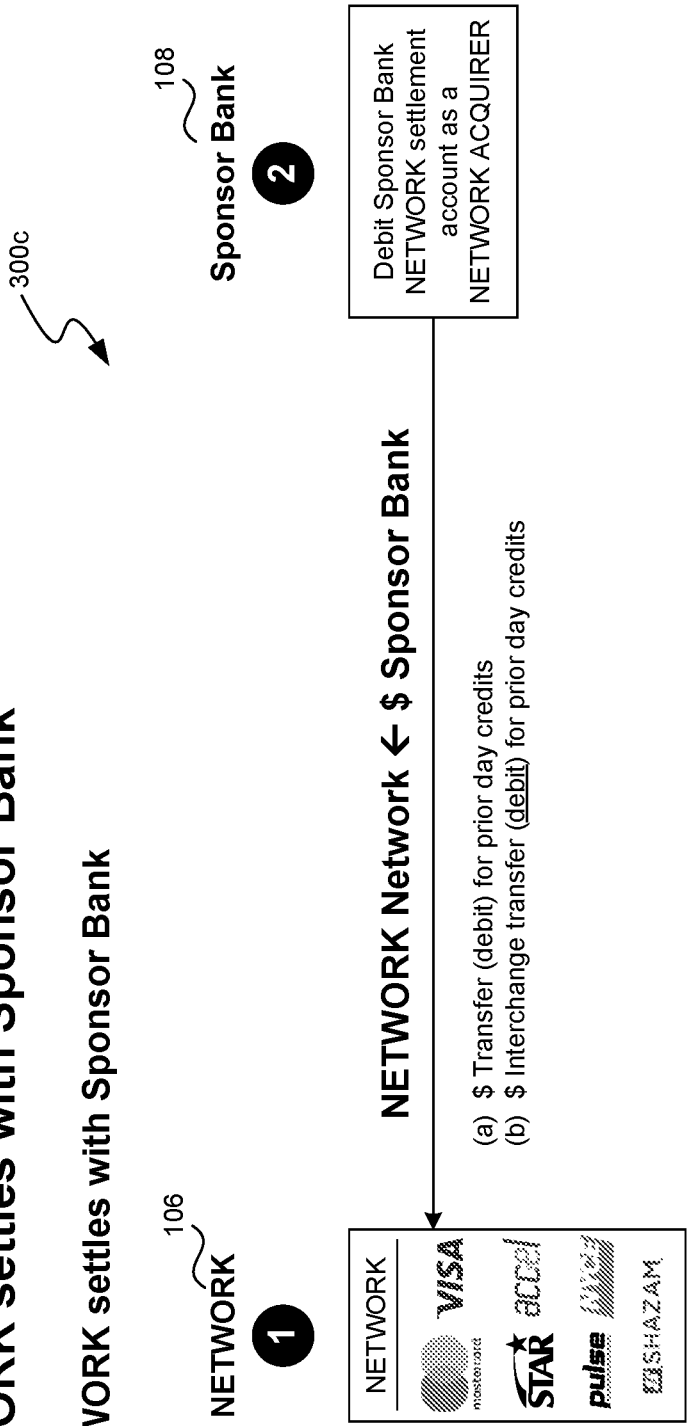

FIG. 3C is a diagram of the process flow 300c by which the network 106 settles with the sponsor bank 108 on Day 1. In step 1 of the process flow 300c, the network 106 sends a first transfer (a debit) for the prior day credit and a second transfer (also a debit) for the prior day interchange to the sponsor bank 108. At step 2, the sponsor bank 108 receives the transfers (debits) from the network 106 and reconciles the network acquiring activity according to their existing process. Accordingly, in the embodiment of the process flow 300c, the sponsor bank 108 settles with (e.g., transfers funds to) the network 106 for the prior day credits and interchanges. Although process flow 300c is described herein after the process flow 300b (FIG. 3B), in some embodiments the sponsor bank 108 settles with the network 106 in process flow 300c before or at the same time as the network 106 settles with the financial institution 110 in process flow 300b.

Figure 3D:
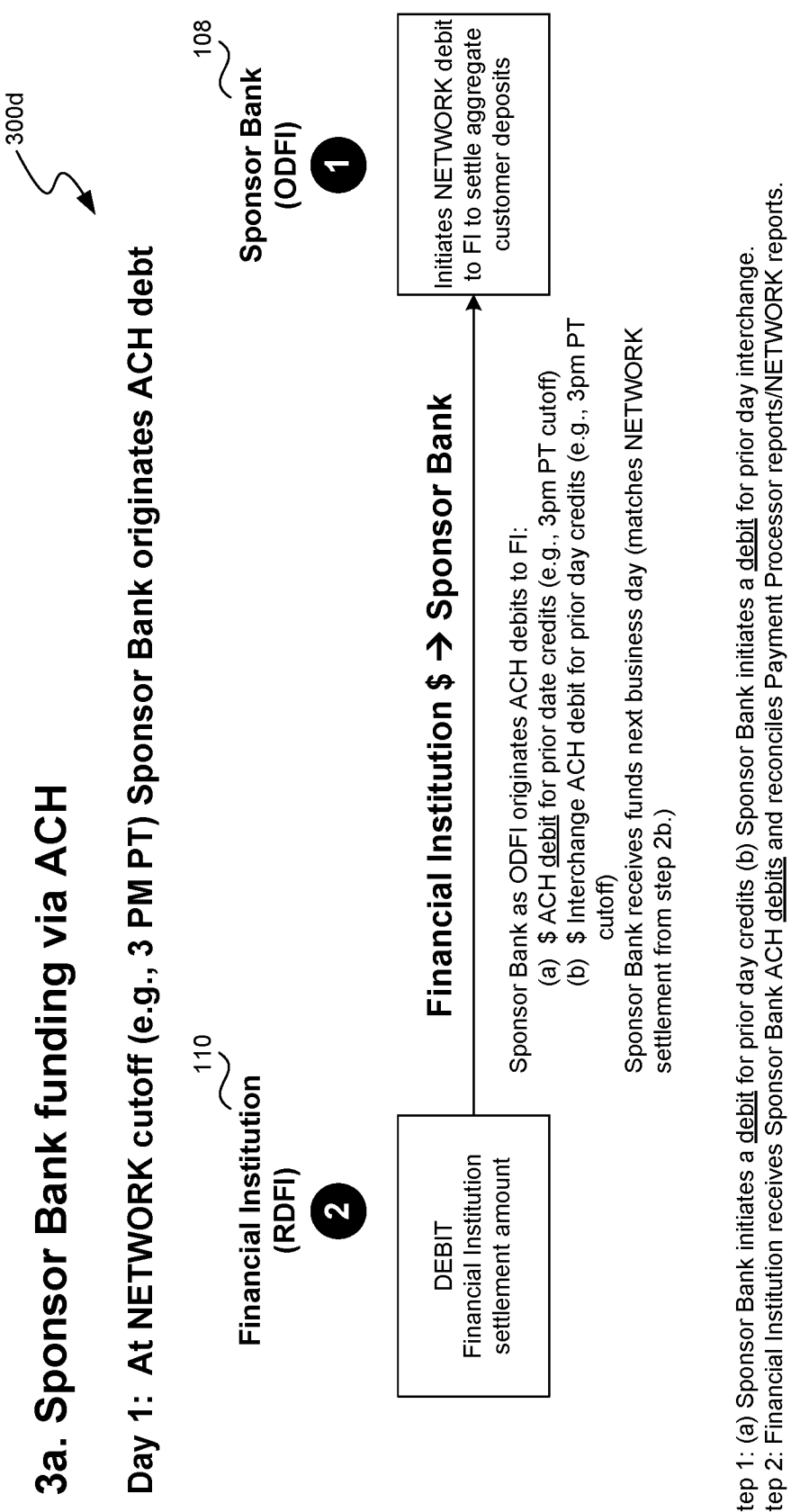
Figure 3E:
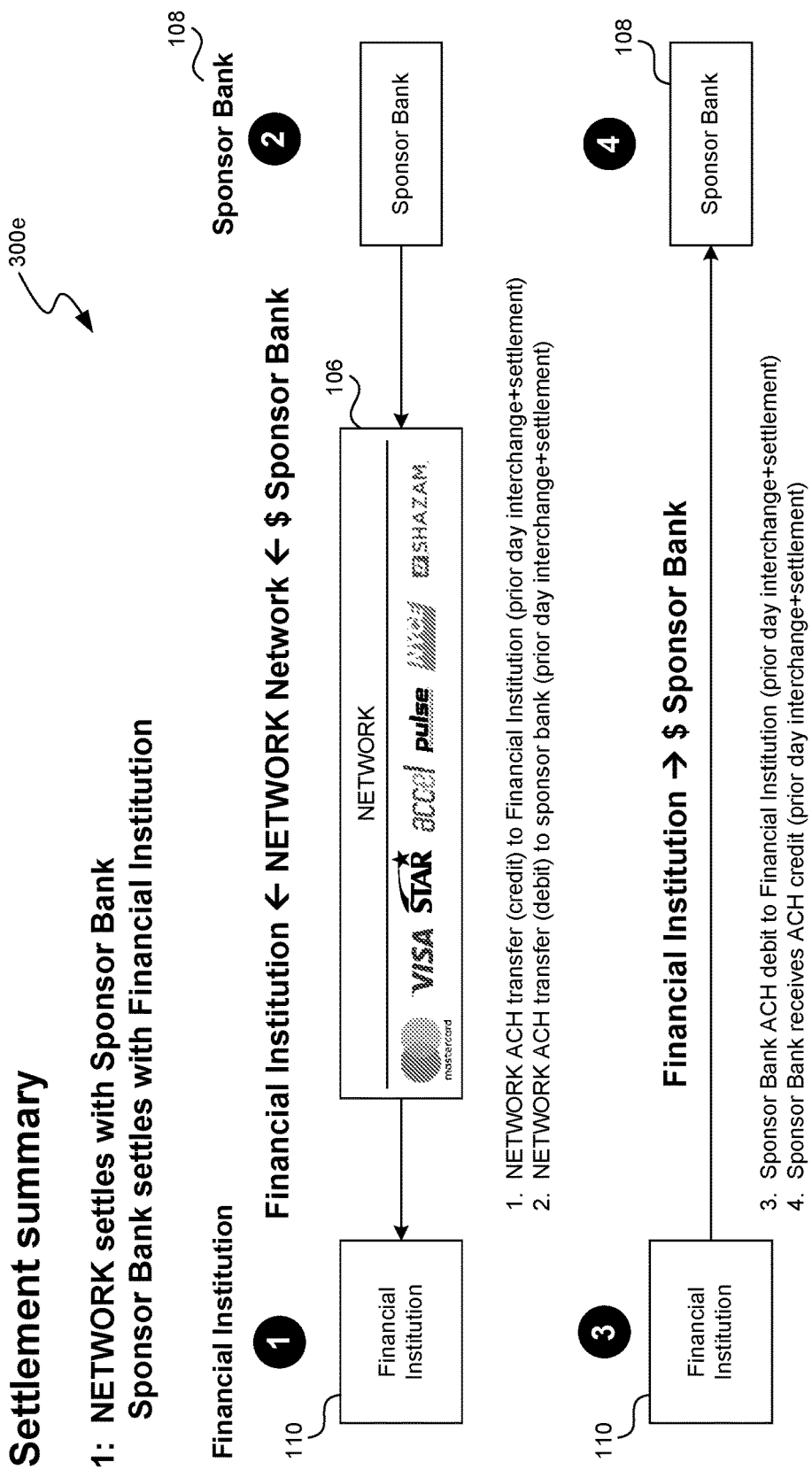
Figure 3F:
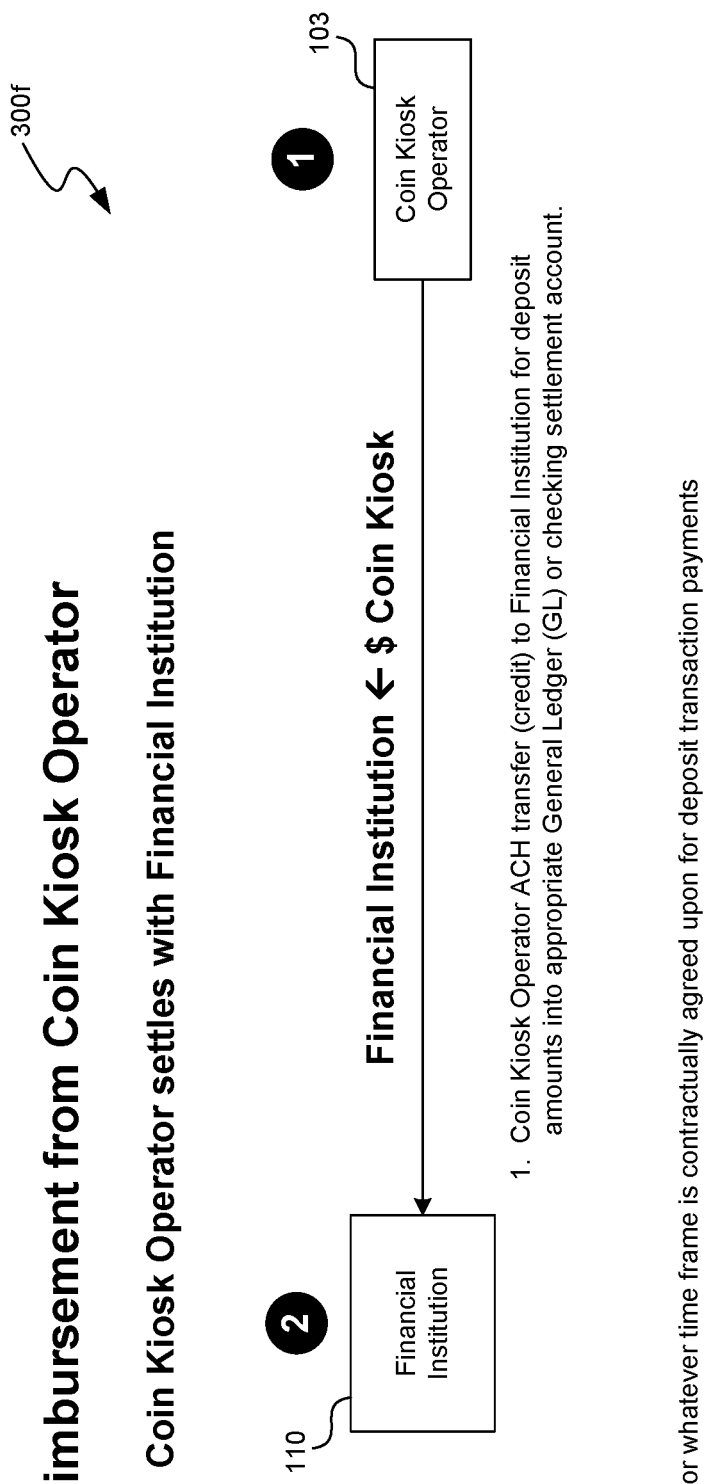
Figure 3G:
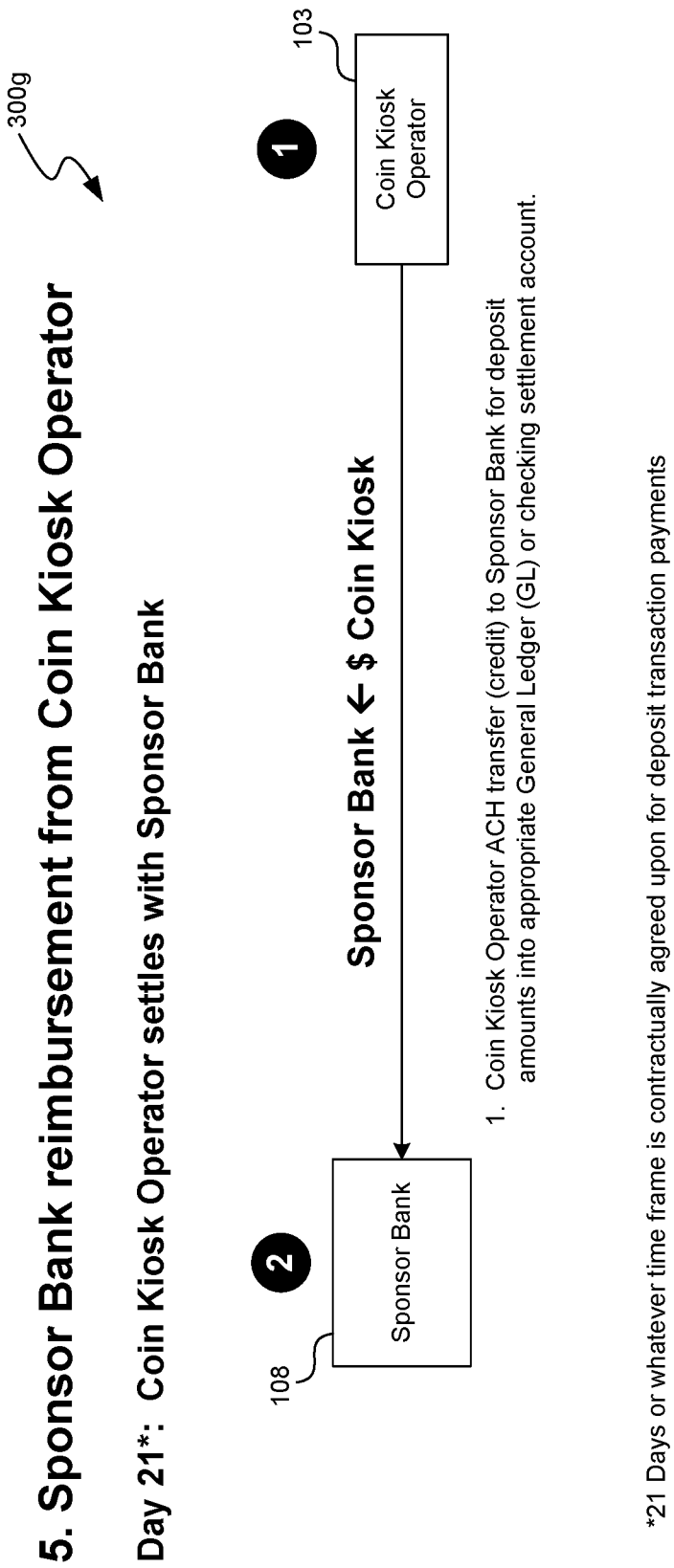

In some embodiments, the process for reimbursing the sponsor bank 108 for transferring money to the network 106 in the process flow 300c can differ based on whether the kiosk 102 is located at a financial institution or at a retail setting other than a bank (e.g., in a retail store or other publicly accessible area). For example, FIGS. 3D-3F illustrate a process by which the sponsor bank 108 (and the financial institution 110) are reconciled in embodiments in which the kiosk 102 is located at a financial institution (e.g., the financial institution 110 or other financial institution), in accordance with some embodiments of the present technology. By way of comparison, FIG. 3G illustrates a process by which the sponsor bank 108 is reimbursed in other embodiments in which the kiosk 102 is located in a setting (e.g., a retail setting) other than a bank. As will be described in greater detail below, in embodiments in which the kiosk 102 is located at a financial institution, the financial institution 110 reimburses the sponsor bank 108 shortly after the sponsor bank 108 transfers money to the network 106 in the process flow 300c. In these embodiments, the kiosk operator 103 settles directly with the financial institution 110. In contrast, in embodiments in which the kiosk 102 is located at a retail setting other than a bank, the financial institution 110 does not reimburse the sponsor bank 108, and the sponsor bank 108 instead settles directly with the kiosk operator 103.

In particular, FIG. 3D is a diagram of the process flow 300d by which the sponsor bank 108 originates an Automated Clearing House (ACH) debit to the financial institution 110 on Day 1. At step 1 of the process flow 300d, the sponsor bank 108 (operating as the Originating Depository Financial Institution or "ODFI") originates a first ACH debit for the prior day credit and a second ACH debit for the prior day interchange. At step 2, the financial institution 110 receives the ACH debits from the sponsor bank 108 and reconciles them with reports from the payment processor 104 and the network 106. The sponsor bank 108 receives the funds from the financial institution 110 the next business day (e.g., on Day 2), and this matches the settlement funds the sponsor bank 108 provided to the network 106 as described above with reference to FIG. 3C. Accordingly, in the embodiment of the process flow 300d, the financial institution 110 settles with (e.g., transfers funds to) the sponsor bank 108 to reimburse the sponsor bank 108 for the prior day credits and interchanges.

FIG. 3E is a diagram of the process flow 300e that summarizes the settlement process on Day 1 as described above with reference to FIGS. 3B-3D in embodiments in which the kiosk 102 is located at a financial institution. At step 1 of the process flow 300e, the network 106 originates an ACH transfer (a credit) to the financial institution 110 for the prior day debit and the prior day interchange (FIG. 3B). At step 2, the network 106 originates an ACH transfer (a debit) to the sponsor bank 108 for the prior day credit and the prior day interchange (FIG. 3C). At step 3, the sponsor bank 108 originates an ACH debit to the financial institution 110 for the prior day debit and the prior day interchange, and at step 4, the sponsor bank 108 receives an ACH credit from the financial institution 110 for the prior day debit and the prior day interchange (FIG. 3D).

FIG. 3F is a diagram of the process flow 300f by which the coin kiosk operator 103 settles with the financial institution 110. At step 1 of the process flow 300f, the coin kiosk operator 103 originates an ACH transfer (a credit) to the financial institution 110 for the prior day credit. At step 2, the financial institution receives the ACH credit as a deposit amount into the appropriate General Ledger (GL) or a checking settlement account. In some embodiments, the deposit amount is less any interchange fee paid to the kiosk operator 103 for accepting the card-based deposit to the customer's account. Accordingly, in the embodiment of the process flow 300f, the coin kiosk operator 103 settles with (e.g., transfers funds to) the financial institution 110 to reimburse the financial institution 110 for the Day 0 credit to the customer's account.

FIG. 3G is a diagram of a process flow 300g by which the coin kiosk operator 103 settles with the sponsor bank 108 when the kiosk 102 is located in a retail setting other than a bank, in accordance with some embodiments of the present technology. The process flow 300g can occur after the process flow 300c (FIG. 3C), and replaces the process flows 300d-300f (FIGS. 3D-3F). At step 1 of the process flow 300g, the coin kiosk operator 103 originates an ACH transfer (a credit) to the sponsor bank for the sponsor's bank transfer of funds to the network in process flow 300c (FIG. 3C). At step 2, the sponsor bank 108 receives the ACH credit as a deposit amount into the appropriate General Ledger (GL) or a checking settlement account. The deposit amount is equal to the amount the sponsor bank transferred to the network in process flow 300c. Accordingly, in process flow 300g, the coin kiosk operator 103 settles with (e.g., transfers money to) the sponsor bank 108 on a periodic basis or other time frame to reimburse the sponsor bank 108 for prior credit amounts.

The foregoing processes are provided to more clearly describe aspects of the present technology. However, as one skilled in the art will appreciate from the disclosure herein, the present technology is not limited the processes described above and below, and can include variations of the described processes. For example, in some embodiments, some of the steps described for the disclosed processes may be omitted, some of the steps may be performed in a different order, some of the steps may be combined into a single step, and/or additional steps may be included.

Figure 4:
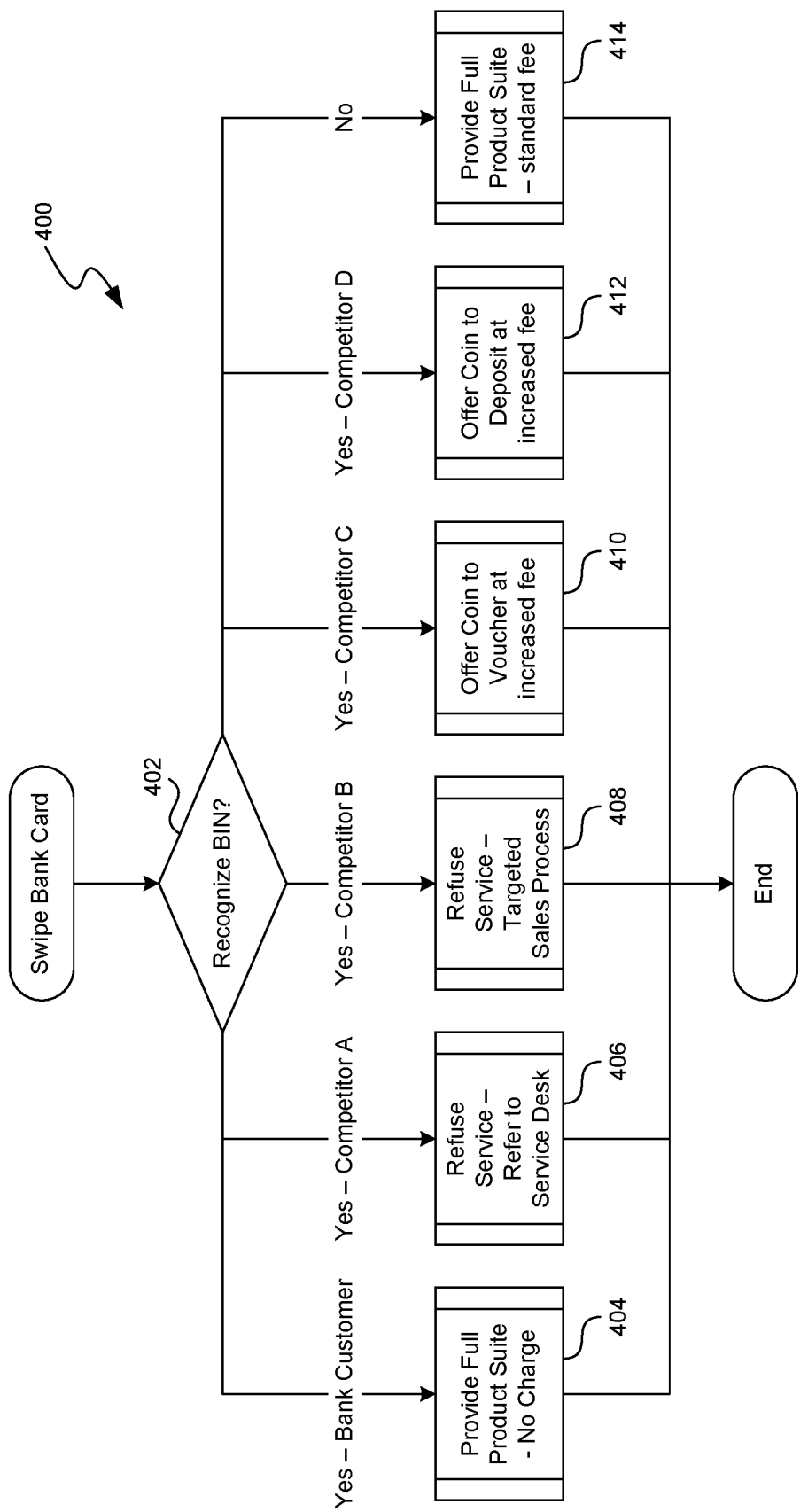
FIG. 4 is a flow diagram of a routine for processing a consumer deposit transaction at a kiosk in accordance with embodiments of the present technology.

FIG. 4 is a flow diagram of a routine 400 for processing a consumer deposit transaction at the kiosk 102 in accordance with embodiments of the present technology. As described in greater detail below, in some embodiments the routine 400 enables the kiosk 102 to vary the range of products offered to a customer, and/or the fees charged for those products, based on the bank identified by the customer. All or a portion of the routine 400 can be performed by the processor 212 of the kiosk 102 in accordance with computer readable instructions stored on the memory 214 (FIG. 2). In other embodiments, all or a portion of the routine 400 can be performed by one or more processing devices associated with the kiosk operator 103. The routine 400 starts when the customer swipes their bank card through (or inserts their bank card into) the card reader 210 at the kiosk 102. In decision block 402, the routine 400 reads the BIN off the card and determines if it recognizes the BIN. In some embodiments, this can entail comparing the BIN to a list of BINs stored in an associated database to determine if, for example, the BIN identifies a bank or other financial institution that can receive deposits from the kiosk and, if so, what the status of the financial institution is. For example, in some embodiments the kiosk 102 may be located at a bank, and the BIN may identify the bank at which the kiosk 102 is located, or the BIN may identify a competitor bank. In some instances, a competitor bank may nonetheless be able to receive deposits from the kiosk 102, and in other instances, a competitor bank may be outside the network of financial institutions that are set up or otherwise available to receive deposits from the kiosk 102. In some embodiments, the kiosk 102 can identify the financial institution in the absence of receiving a unique code (e.g., a personal identification number) associated with the user and the user's bank card.

If the routine 400 recognizes the BIN as being associated with, for example, the bank or other financial institution at which the kiosk 102 happens to be located, and thereby determines that the customer is a customer of that financial institution, then the routine 400 proceeds to block 404 and offers the customer the full range of transaction options (e.g., also referred to herein as "products") provided by the kiosk 102 at reduced or no charge. These products may include performing a direct deposit of the customer's coin (and/or paper cash) value into an account at the bank, providing the customer with an e-certificate for making online purchases, purchasing virtual gift cards, etc. The options available to the customer can be displayed on the display screen 206 of the kiosk 102 (FIG. 2). If the customer elects to have their coin or cash value deposited in their account at the bank, the customer can select this option and the deposit can be implemented using the processes described above with reference to FIGS. 3A-3F. In those instances in which the kiosk 102 is positioned at a store or other publicly accessible area other than a bank, the routine can proceed to block 404 when it recognizes the BIN as being associated with a bank that has a preferred relationship with the kiosk operator 103 or has otherwise been selected to receive direct deposits from the kiosk 102 in accordance with an arrangement between the kiosk operator 103 and the bank. In such embodiments, if the customer elects to have their coin or cash value deposited in their account at the bank, the customer can select this option and the deposit can be implemented using the processes described above with reference to, e.g., FIGS. 3A-3C and 3G.

Returning to decision block 402, if the routine recognizes the BIN as being associated with a competitor bank or a bank that is otherwise not approved or set up to receive deposits from the kiosk 102 (e.g., Competitor A), the routine can proceed to block 406 and refuse service to the customer and/or refer the customer to the service desk at the bank or other establishment at which the kiosk 102 is located (e.g., by displaying a message via the display screen 206). Alternatively, the routine may recognize the BIN as being associated with a different competitor bank (e.g., Competitor B), and proceed to block 408. In block 408, the routine can refuse service to the customer, but rather than refer the customer to the service desk, the display screen 206 can instead display a "customer acquisition" screen to the customer that encourages the customer to become a member of the bank at which the kiosk 102 is located (or other preferred financial institution). More specifically, in some embodiments, the routine 400 will recognize that the customer BIN is associated with a competitor bank (e.g., Competitor B), but also recognize that customers of competitor bank B frequently switch from competitor B to the preferred bank (e.g., the bank at which the kiosk 102 is located or another bank that has a favorable business arrangement with the kiosk operator 103). In such instances, the kiosk 102 can display one or more screens to the customer (e.g., customer acquisition screens) that attempt to encourage and facilitate the customer changing from competitor bank B to the preferred bank. Accordingly, in such embodiments, the kiosk 102 can also provide a direct contact to the preferred bank's Internet sales funnel via a display page presented on the display screen 206, thereby enabling the customer to potentially open a new account at the preferred bank while at the kiosk, and thereafter directly deposit their coin value in the new account.

As the foregoing illustrates, embodiments of the present technology enable the kiosk 102 to vary the transaction options and product offerings to individual customers depending on the BIN of their financial institution. This can prove advantageous to generate new customers for the preferred bank, as well as leverage different fee structures depending on the different arrangements the kiosk operator 103 may have with the different financial institutions. For example, in some embodiments the systems can provide a first set of transaction options to the user if the user's bank card is associated with a first financial institution (e.g., a preferred bank), and a second set of transaction options if the user's bank card is associated with a second financial institution (e.g., a competitor or unidentified bank), and no transaction options if the user's bank card is associated with a third financial institution (e.g., another competitor bank). At least one transaction option of the first set of transaction options can be at least partially different than the transaction options of the second set. Alternatively or additionally, at least one transaction option of the first set of transaction options can be associated with a user fee that is different than a user fee associated with a corresponding transaction option of the second set. The user fee for the at least one transaction option can be zero or otherwise reduced relative to the user fee for the corresponding transaction option of the second set.

For example, if the routine recognizes the BIN as being associated with Competitor C, the routine can proceed to block 410 and offer a limited set of kiosk products (e.g., only a coin-to-voucher product) at an increased fee. Alternatively, if the kiosk 102 recognizes the BIN as being associated with yet a different competitor, such as Competitor D, the routine can proceed to block 412 and offer a different product, such as "coin to deposit" as described herein, but at an increased fee to the customer. Further yet, if the routine 400 is unable to recognize the BIN at all, the routine 400 can proceed to block 414 and provide the full range of products offered by the kiosk 102 (except for direct deposit) at the standard fees. After performing one or more of blocks 404-414, the routine 400 ends.

Figure 5A:
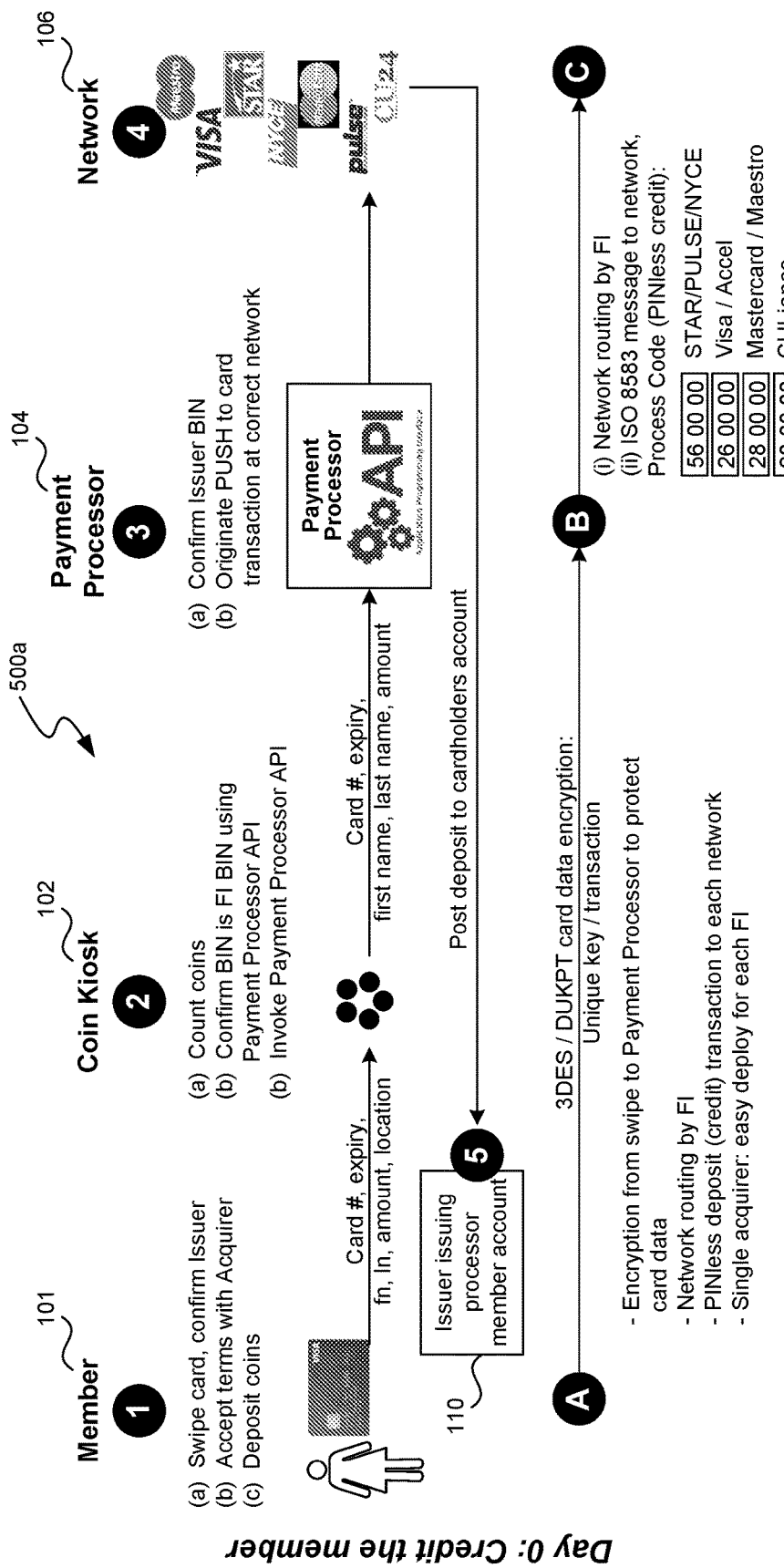

FIGS. 5A and 5B are diagrams illustrating process flows 500a and 500b for depositing monetary value (e.g., coin value, paper bill value, etc.) into a user account (e.g., a debit card account) using the environment 100 of FIG. 1 in accordance with embodiments of the present technology. As the reader will note, many aspects of the process flows 500a and 500b are at least generally similar to the corresponding aspects of the process flows 300a-300c described in detail above with reference to FIGS. 3A-3C. For example, referring to FIG. 5A, the process flow 500a illustrates a process for directly depositing customer coin value to a financial institution account at Day 0. Similar to the process flow 300a described above, at step 1 of the process flow 500a the customer swipes (or inserts) their bank card (e.g., a debit card), agrees to the terms for the direct deposit transaction, and then deposits their coins into the kiosk 102. As noted above, in some embodiments the customer does not enter a PIN at the kiosk 102 to perform the direct deposit transaction. Instead, the customer can just swipe their card through, or insert their card into, the card reader 210. For example, in some embodiments, the card reader 210 can be configured to read EMV cards. As is known, "EMV" stands for EuroPay, Mastercard® and Visa®, and such cards typically include an embedded chip that can include transaction and security information which may not be included on typical magnetic stripe cards. Inserting such cards into a card reader can also be referred to as "dipping" the card.

As illustrated by stage (A) (indicated in FIG. 5A by a black dot with a white integer and textually beneath the diagram), the card reader 210 reads the information off the card (e.g., the card number, card expiration date, customer identification information, etc.) and encrypts this information before transmitting the information to the payment processor 104. In some embodiments, for example, this information can be encrypted by the card reader 210 using DUKPT, 3DES and/or other encryption standards.

At step 2 of the process flow 500a, the kiosk 102 counts the coins deposited into the kiosk 102 by the user and confirms that the BIN is associated with a financial institution (e.g., a financial institution that is available for direct deposits via the kiosk 102). After confirming the BIN, the kiosk 102 invokes a payment processor Application Programing Interface (API) to communicate with the payment processor 104 and initiate the crediting of the customer's coin value to the customer's account.

At step 3 of the process flow 500a, the payment processor 104 decrypts the card data received from the coin kiosk 102, as indicated by stage (B). The payment processor 104 determines the correct network to receive the card transaction data based on the BIN of the card, and the network preference indicated by the Financial Institution 110 associated with the BIN. In some embodiments, the payment processor 104 can implement the transaction as a "PINless" credit transaction by using, e.g., an existing PINless debit routing channel (which may also be referred to as a "PINless rail"). A PINless transaction takes place when a merchant or other entity chooses to have no customer verification method (CVM). Networks suitable for PINless transactions can be identified by a standard code, as illustrated at stage (C) in FIG. 5A. Accordingly, the payment processor 104 routes the transaction information to the appropriate network 106 at step 4, and then the network 106 sends the PINless credit instruction to the financial institution (the card issuer) to post the "instant" deposit (e.g., same day deposit) to the cardholder's account in step 5.

Turning next to FIG. 5B, steps 1 and 2 of the process flow 500b are at least generally similar to the corresponding steps of the process flows 300b and 300c described in detail above with reference to FIGS. 3B and 3C, respectively. For example, at step 1, the payment network 106 transfers deposits to the financial institution 110 for the prior day's coin and/or cash deposits, which correspond to the deposit instructions received from the payment processor 104. Additionally, the payment network 106 also transfers the interchange/reimbursement fees from the deposits to the financial institution 110. At step 2, the payment network 106 debits the acquirer 108 (which can also be referred to as the sponsor bank) for the deposits the payment network 106 made to the financial institution in step 1 above. In embodiments in which the kiosk 102 is located at a financial institution, the acquirer 108 debits the financial institution in step 3 for the payments made to the payment network in step 2, e.g., as described in detail above with reference to process flow 300d of FIG. 3D. Periodically, the coin kiosk operator 103 settles with the financial institution for the customer deposits, e.g., as described in detail above with reference to process flow 300e of FIG. 3E. In one aspect of the process flow 500b, the direct deposit transaction can be carried out with a single acquirer that is reimbursed daily by the financial institution 110 for originating the disbursements to the payment network 106.

In embodiments in which the kiosk 102 is located at a retail setting other than a bank, the acquirer 108 does not debit the financial institution (e.g., step 3 is omitted from process flow 500b). Rather, as described in detail above with reference to process flow 300g of FIG. 3G, the coin kiosk operator 103 directly settles with the sponsor bank 108 for the customer deposits.

Figure 6:
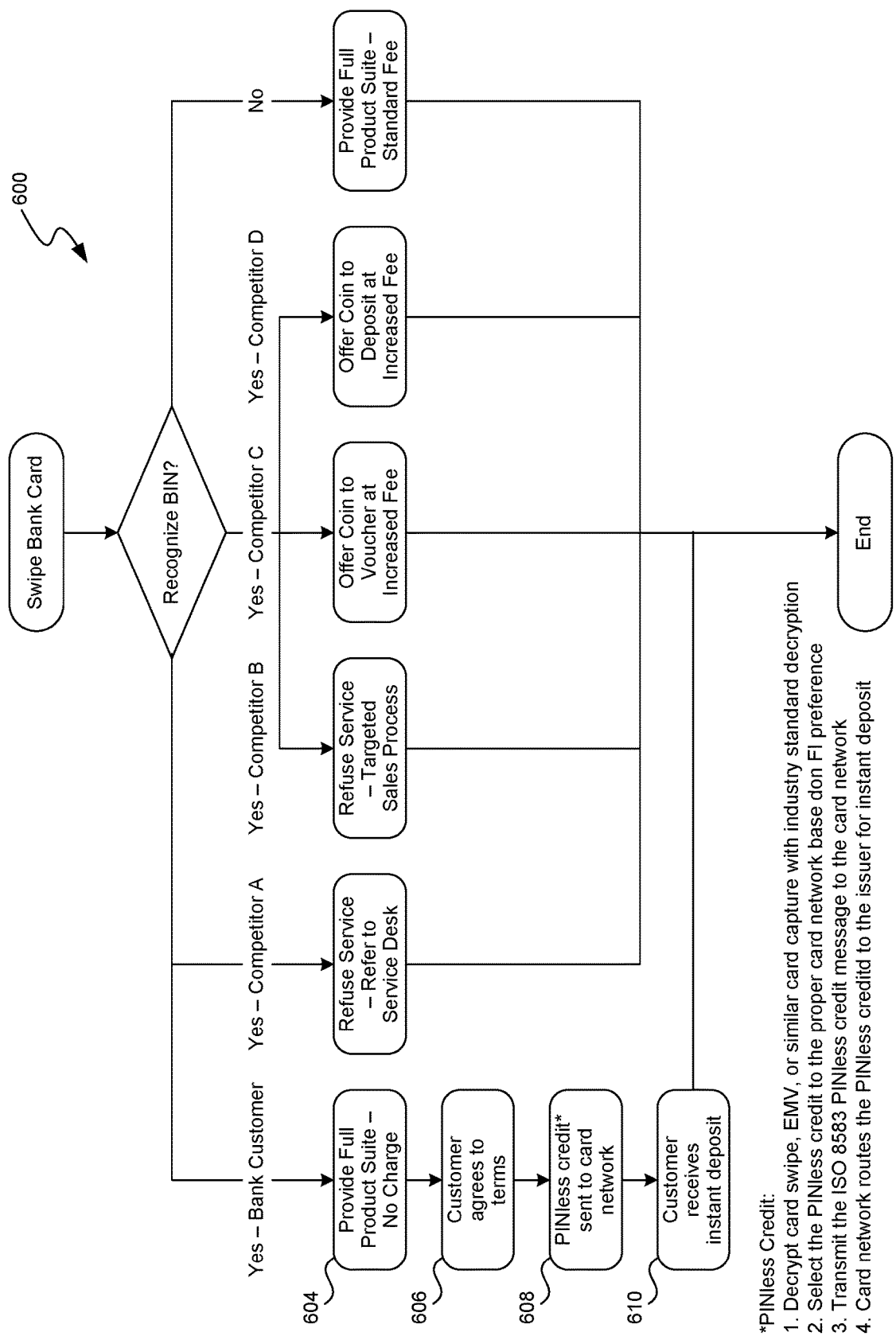
FIG. 6 is a flow diagram of a routine for processing a consumer deposit transaction at a kiosk in accordance with other embodiments of the present technology.

FIG. 6 is a flow diagram of a routine 600 for processing a consumer deposit transaction at the kiosk 102 in accordance with embodiments of the present technology. Accordingly, all or a portion of the routine 600 can be performed by the kiosk processor 212 (and/or a processor associated with the kiosk operator 103) in accordance with computer readable instructions stored on memory 214. The routine 600 is generally the same as, or at least generally similar to, the routine 400 described in detail above with reference to FIG. 4. Accordingly, the routine 600 enables the kiosk 102 to vary the range of transaction products offered to a customer, and/or fees for such products, based on, for example, the financial institution identified by the customer's bank card (or, more specifically, identified by the BIN stored on the card).

In one aspect of the illustrated embodiment, if the customer is associated with a "preferred" financial institution (e.g., a financial institution in which the kiosk 102 is located), then at block 604, the kiosk can offer the full product suite to the customer at no charge. In some embodiments, this can include offering the customer the opportunity to make a direct deposit (e.g., a PINless deposit of coin value) to the customer's account (e.g., a debit card account). In block 606, if the customer selects this transaction, the customer agrees to the terms and swipes, inserts, or otherwise enables the card information to be captured by the kiosk. In block 608, the deposit transaction is performed by the entities of FIG. 1 as described above with reference to, for example, FIGS. 5A and 5B. For example, this can include the payment processor 104 receiving the BIN and other encrypted transaction data from the customer's card, and decrypting the encrypted information before sending the corresponding transaction information to the proper card network 106 based on the network preference associated with the corresponding financial institution 110. The network 106 then routes the deposit transaction information to the financial institution 110, and as shown in block 610, the customer account receives the deposit of the customer's coin value.

Figure 7:
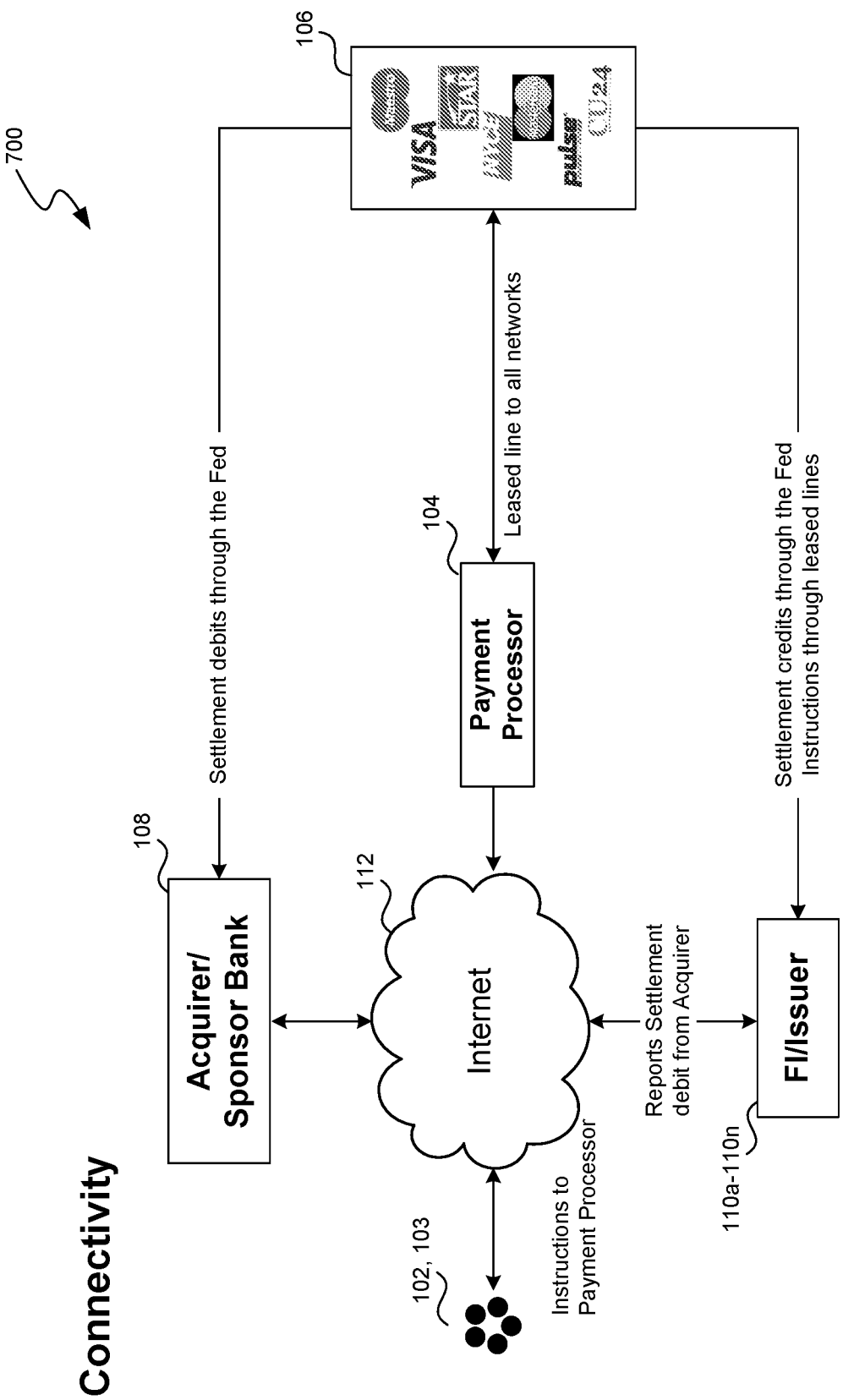
FIG. 7 is a schematic diagram illustrating suitable connectivity of components of a network environment for enabling consumers to deposit coin value and/or other funds in an account at a financial institution, in accordance with embodiments of the present technology.

FIG. 7 is a schematic diagram illustrating connectivity between some of the entities in the environment 100 described above with reference to FIG. 1, in accordance with embodiments of the present technology. In one aspect of the illustrated embodiment, the coin kiosks 102 and/or the coin kiosk operator 103 can transmit payment instructions (including encrypted data) to the payment processor 104 via a public network, for example, a network including the Internet 112. The network 106, however, can use leased communication lines (e.g., a private network or other communication facility, including secure communication facilities) to exchange information with the payment processor 104.

Additionally, the network 106 can transmit settlement debits to the acquirer 108 and settlement credits to the financial institution 110 through the Federal Reserve via, e.g., leased lines.

Some embodiments of the present technology provide a number of advantages over existing bank deposit systems. For example, embodiments of the technology described herein enable customers to make direct deposits of cash value (e.g., coin and/or paper bill value) into their bank accounts using a self-service kiosk. Additionally, in some embodiments, the direct deposit can occur "instantly" after the customer has concluded the deposit transaction at the kiosk, and such deposits can be made with a simple swipe of a bank card (e.g., a debit card) without the customer entering a PIN. Such embodiments can also benefit banks and other financial institutions by enabling them to offer their customers free self-service coin deposit services from, e.g., a kiosk located in their lobby and/or a network of kiosks located in other publicly accessible locations, with little or no additional overhead or resources required by the financial institution. The relative ease by which the financial institutions can deploy the direct deposit solutions described herein can be enabled, in some embodiments, by the use of a single acquirer/sponsor bank that assumes the risk and handles the processing for the transaction that would normally be handled by the financial institution. Additionally, the embodiments described herein can enable the acquirer/sponsor bank to settle all outstanding transactions on a daily basis.

As used herein, the term "issuer" can refer to a financial institution that issues customers cards, such as debit cards; the term "acquirer" or "sponsor bank" can refer to the financial institution that sponsors the deposit transaction (e.g., PINless credit transactions) in all, or one or more, payment networks; the term "payment networks" can refer to Visa®, Mastercard®, Maestro, STAR®, NYCE, PULSE, Accel, CULiance, SHAZAM, AFFN®, and/or any other network able to accept a deposit, such as a direct PINless deposit; and the term "payment processor" can refer to an entity that acquires the card swipe/EMV device data, decrypts the encrypted card data, transmits deposit instructions to the payment network, and settles funds between the acquirer, the network, and, in some embodiments, the issuer as described herein.

FIGS. 3A-6 are representative flow diagrams that depict processes used in some embodiments of the present technology. These flow diagrams do not show all functions or exchanges of data, but instead they provide an understanding of commands and data exchanged under the system. Those skilled in the relevant art will recognize that some functions or exchange of commands and data may be repeated, varied, omitted, or supplemented, and other (less important) aspects not shown may be readily implemented.

Each of the steps depicted in FIGS. 3A-6 can itself include a sequence of operations, some of which need not be described herein. Those of ordinary skill in the art can create source code, microcode, program logic arrays or otherwise implement the disclosed technology based on the flow diagrams and the Detailed Description provided herein. Although not required, aspects of the technology are described in the general context of computer-executable instructions, such as routines executed by a general-purpose data processing device, e.g., a server computer, central processing unit, wireless device, personal computer, etc. Those skilled in the relevant art will appreciate that aspects of the invention can be practiced with other data processing, communications, or computer system configurations, including: Internet appliances, handheld devices, wearable computers, all manner of cellular or mobile phones (including Voice over IP (VoIP) phones), dumb terminals, media players, multi-processor systems, microprocessor-based or programmable consumer electronics, network PCs, minicomputers, mainframe computers, and the like. Indeed, the terms "computer," "server," "host," "host system," and the like may be used interchangeably herein, and may refer to any of the above devices and systems, as well as any data processor.

Aspects of the invention may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present technology may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). One skilled in the relevant art will appreciate that the concepts of the invention can be used in various environments other than location based or the Internet. The system may be conducted within a single computer environment, rather than a client/server environment. Also, the user computers may comprise any combination of hardware or software that interacts with the server computer, such as television-based systems and various other consumer products through which commercial or noncommercial transactions can be conducted.

In general, textual and graphical displays on the display screen 206 may be implemented in any of various ways, such as in C++ or as web pages in XML (Extensible Markup Language), HTML (HyperText Markup Language) or any other scripts or methods of creating displayable data, such as the Wireless Access Protocol ("WAP"). The displays provide facilities to present information and receive input data, such as a form or page with fields to be filled in, pull-down menus or entries allowing one or more of several options to be selected, buttons, sliders, hypertext links or other known user interface tools for receiving user input. While certain ways of displaying information to users is shown and described with respect to certain Figures, those skilled in the relevant art will recognize that various other alternatives may be employed. The terms "screen," "web page" and "page" are generally used interchangeably herein.

The above Detailed Description of examples and embodiments of the invention is not intended to be exhaustive or to limit the invention to the precise form disclosed above. While specific examples for the present technology are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel or may be performed at different times.

Any patents and applications and other references noted above, including any that may be listed in accompanying filing papers, are incorporated herein by reference in the entirety, except for any subject matter disclaimers or disavowals, and except to the extent that the incorporated material is inconsistent with the express disclosure herein, in which case the language in this disclosure controls. Aspects of the invention can be modified, if necessary, to employ the systems, functions, and concepts of the various references described above to provide yet further implementations of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

We claim:

1. A consumer-operated kiosk, comprising:
    a funds input portion for receiving coins and paper bills, wherein the funds input portion includes—
        a tray configured to receive the coins, and
        a bill acceptor configured to receive the paper bills;
    a funds counting portion for determining a value of the coins and the paper bills received at the funds input portion, wherein the funds counting portion includes—
        a coin discriminator configured to discriminate the coins received at the tray and count a total value of the coins, and
        a bill counter configured to discriminate the paper bills received at the bill acceptor and count a total value of the paper bills;
    a card reader configured to read information from a card; and
    a user interface including a display;
    wherein the consumer-operated kiosk is configured to:
        receive funds from a user via the funds input portion, the funds including coins and paper bills;
        determine a value associated with the funds received from the user via the funds counting portion;
        read information from a bank card submitted by the user via the card reader;
        in response to reading the information from the bank card, determine a financial institution associated with the bank card;
        in response to determining the financial institution associated with the bank card, determine one or more transaction options available to the user for use of the value of the received funds, wherein—
            if the financial institution is a first financial institution, a first set of one or more transaction options is available to the user, and
            if the financial institution is a second financial institution, a second set of one or more transaction options is available to the user,
            wherein (a) at least one transaction option of the first set is at least partially different than the transaction options of the second set, and/or (b) the at least one transaction option of the first set is associated with a user fee that is different than a user fee associated with a corresponding transaction option of the second set; and
        display the one or more transaction options to the user via the user interface.

2. The consumer-operated kiosk of claim 1 wherein the at least one transaction option of the first set is executable at the kiosk without a user fee, and wherein the corresponding transaction option of the second set is executable at the kiosk only with a user fee.

3. The consumer-operated kiosk of claim 1 wherein the first set of transaction options include more transaction options than the second set of transaction options.

4. The consumer-operated kiosk of claim 1 wherein the first set of transaction options includes depositing the value of the funds into a bank account associated with the bank card without a fee.

5. The consumer-operated kiosk of claim 4 wherein the consumer-operated kiosk is located at a location of the first financial institution.

6. The consumer-operated kiosk of claim 1 wherein the second set of transaction options includes depositing the value of the funds into a user's bank account associated with the bank card with a user fee.

7. The consumer-operated kiosk of claim 1 wherein the information read from the bank card includes a bank identification number, and wherein the kiosk is configured to compare the bank identification number to a database of bank identification numbers associated with a plurality of individual financial institutions to identify the financial institution.

8. The consumer-operated kiosk of claim 1 wherein the kiosk is configured to read information from the bank card and determine the financial institution associated with the bank card without receiving a unique code associated with the user and/or the bank card.

9. The consumer-operated kiosk of claim 8 wherein the unique code is a personal identification number.

10. The consumer-operated kiosk of claim 1 wherein the kiosk is further configured to:
    receive a selection of one of the one or more transaction options; and
    initiate the selected transaction in the absence of receiving a personal identification number associated with the user and/or the bank card.

11. The consumer-operated kiosk of claim 1 wherein the card reader is further configured to encrypt at least some of the information read from the bank card, and wherein the kiosk is configured to send the encrypted information to a payment processor for confirming the financial institution and/or the bank card.

12. The consumer-operated kiosk of claim 11 wherein the card reader is configured to encrypt the at least some information using a DUKPT and/or 3DES encryption standard.

13. A system, comprising:
a consumer-operated kiosk, including—
a funds input portion for receiving coins and paper bills, wherein the funds input portion includes—
a tray configured to receive the coins, and
a bill acceptor configured to receive the paper bills;
a funds counting portion for determining a value of the coins and the paper bills received at the funds input portion, wherein the funds counting portion includes—
a coin discriminator configured to discriminate the coins received at the tray and count a total value of the coins, and
a bill counter configured to discriminate the paper bills received at the bill acceptor and count a total value of the paper bills; and
a user interface configured to receive information associated with a financial institution; and
a computing device operably associated with the kiosk, the computing device having a memory and one or more processors, the memory storing instructions that, when executed by the one or more processors at least partially in response to a user inputting funds via the funds input portion of the kiosk and providing information associated with a financial institution via the user interface, cause the system to:
determine a value associated with the funds received from the user;
determine a financial institution associated with the information provided by the user;
in response to determining the financial institution, determine one or more transaction options available to the user for use of the value of the received funds, wherein—
if the financial institution is a first financial institution, a first set of one or more transaction options is available to the user, and
if the financial institution is a second financial institution, a second set of one or more transaction options is available to the user,
wherein (a) at least one transaction option of the first set is at least partially different than the transaction options of the second set, and/or (b) the at least one transaction option of the first set is associated with a user fee that is different than a user fee associated with a corresponding transaction option of the second set; and
display the one or more transaction options to the user via the user interface.

14. The system of claim 13 wherein the user interface includes a card reader configured to read information from a bank card provided by the user.

15. The system of claim 14 wherein the at least one transaction option of the first set includes depositing the value of the funds into a user's bank account associated with the bank card without a fee, and wherein the corresponding transaction option of the second set includes depositing the value of the funds into the user's account associated with the bank card with a user fee.

16. The system of claim 14 wherein the at least one transaction option of the first set includes depositing the value of the funds into a user's bank account associated with the bank card with a first user fee, and wherein the corresponding transaction option of the second set includes depositing the value of the funds into the user's account associated with the bank card with a second user fee, the second user fee being greater than the first user fee.

17. The system of claim 14 wherein the instructions further cause the system to read information from the bank card in response to the user engaging the card reader with the bank card, and wherein the operation of determining the financial institution includes using the information read from the bank card without receiving a personal identification number associated with the user and the user's bank card.

18. The system of claim 13 wherein the consumer-operated kiosk includes the computing device.

19. The system of claim 13 wherein at least a portion of the computing device is located remotely from the consumer-operated kiosk.

20. A method of conducting a financial transaction using a consumer-operated kiosk, the method comprising:
receiving funds from a user via a funds input region of the consumer-operated kiosk, wherein the funds input region includes a tray configured to receive coins and a bill accepter configured to receive paper bills, and wherein the funds received include coins and/or paper bills;
determining a value associated with the funds received from the user via a funds counting portion of the consumer operated kiosk, wherein the funds counting portion includes (i) a coin discriminator configured to discriminate the coins received at the tray and count a total value of the coins, and (ii) a bill counter configured to discriminate the paper bills received at the bill acceptor and count a total value of the paper bills;
reading information from a bank card submitted by the user via a card reader of the consumer-operated kiosk;
in response to reading the information from the bank card, determining a financial institution associated with the bank card;
in response to determining the financial institution associated with the bank card, determining one or more transaction options available to the user for use of the value of the received funds, wherein—
if the financial institution is a first financial institution, a first set of one or more transaction options is available to the user, and
if the financial institution is a second financial institution, a second set of one or more transaction options is available to the user,
wherein (a) at least one transaction option of the first set is at least partially different than the transaction options of the second set, and/or (b) the at least one transaction option of the first set is associated with a user fee that is different than a user fee associated with a corresponding transaction option of the second set; and
displaying the one or more transaction options to the user via the user interface.

21. The method of claim 20 wherein the at least one transaction option of the first set includes depositing the value of the funds into a user's bank account associated with the bank card with a first user fee, and wherein the corresponding transaction option of the second set includes depositing the value of the funds into the user's account associated with the bank card with a second user fee, the second user fee being greater than the first user fee.

22. The method of claim 20 wherein the at least one transaction option of the first set includes depositing the value of the funds into a user's bank account associated with the bank card without a fee, and wherein the corresponding transaction option of the second set includes depositing the value of the funds into the user's account associated with the bank card with a user fee.

\* \* \* \* \*

UNITED STATES PATENT AND TRADEMARK OFFICE
CERTIFICATE OF CORRECTION

| | | |
|---|---|---|
| PATENT NO. | : 12,456,342 B2 | Page 1 of 1 |
| APPLICATION NO. | : 17/998229 | |
| DATED | : October 28, 2025 | |
| INVENTOR(S) | : Stephen M. Adams et al. | |

It is certified that error appears in the above-identified patent and that said Letters Patent is hereby corrected as shown below:

In the Drawings

On sheet 11 of 14, in Fig. 5A, Line 27, delete "determins" and insert -- determines --.

On sheet 13 of 14, in Fig. 6, Line 23, delete "creditd" and insert -- credited --.

In the Claims

In Column 17, Line 65, in Claim 1, delete "and" and insert -- and/or --.

Signed and Sealed this
Thirteenth Day of January, 2026

John A. Squires
*Director of the United States Patent and Trademark Office*